United States Patent
Tokutake

(10) Patent No.: US 12,443,327 B2
(45) Date of Patent: Oct. 14, 2025

(54) INFORMATION PROCESSING APPARATUS, INFORMATION PROCESSING PROGRAM, AND INFORMATION PROCESSING SYSTEM

(71) Applicant: Sony Group Corporation, Tokyo (JP)

(72) Inventor: Kenji Tokutake, Tokyo (JP)

(73) Assignee: Sony Group Corporation, Tokyo (JP)

( * ) Notice: Subject to any disclaimer, the term of this patent is extended or adjusted under 35 U.S.C. 154(b) by 190 days.

(21) Appl. No.: 18/559,898

(22) PCT Filed: May 19, 2021

(86) PCT No.: PCT/JP2021/019038
§ 371 (c)(1),
(2) Date: Nov. 9, 2023

(87) PCT Pub. No.: WO2022/244157
PCT Pub. Date: Nov. 24, 2022

(65) Prior Publication Data
US 2024/0272765 A1    Aug. 15, 2024

(51) Int. Cl.
G06F 3/04815    (2022.01)
G06F 3/01    (2006.01)
G06T 19/00    (2011.01)

(52) U.S. Cl.
CPC .......... G06F 3/04815 (2013.01); G06F 3/011 (2013.01); G06T 19/003 (2013.01)

(58) Field of Classification Search
None
See application file for complete search history.

(56) References Cited

U.S. PATENT DOCUMENTS

| | | | |
|---|---|---|---|
| 2018/0109975 A1 | 4/2018 | Kalliola et al. | |
| 2019/0079597 A1* | 3/2019 | Kada | G06F 3/013 |
| 2019/0188895 A1* | 6/2019 | Miller, IV | H04N 7/157 |
| 2019/0329136 A1 | 10/2019 | Koyama | |

(Continued)

FOREIGN PATENT DOCUMENTS

| | | |
|---|---|---|
| CN | 107959944 A | 4/2018 |
| CN | 109952599 A | 6/2019 |

(Continued)

OTHER PUBLICATIONS

International Search Report and Written Opinion mailed on Jun. 29, 2021, received for PCT Application PCT/JP2021/019038, filed on May 19, 2021, 12 pages including English Translation.

*Primary Examiner* — Linda Huynh
(74) *Attorney, Agent, or Firm* — XSENSUS LLP

(57) ABSTRACT

An information processing apparatus includes an acquisition unit configured to acquire local space information indicating space information of a local space where a terminal device is located, local position information indicating position information of the terminal device in the local space, and remote space information indicating space information of a remote space located in a place different from the local space, and a generation unit configured to generate, on the basis of the local space information, the local position information, and the remote space information, information regarding a video to be displayed on the terminal device, the video being a virtual video in a case where the terminal device is at a position corresponding to the local position information in the remote space.

11 Claims, 18 Drawing Sheets

(56) References Cited

U.S. PATENT DOCUMENTS

| | | | |
|---|---|---|---|
| 2020/0051336 A1* | 2/2020 | Ichikawa | G06T 19/006 |
| 2020/0054336 A1 | 2/2020 | Guerrera et al. | |
| 2020/0143775 A1 | 5/2020 | Laaksonen et al. | |
| 2021/0174596 A1* | 6/2021 | Zhang | G06F 16/9558 |
| 2021/0350604 A1* | 11/2021 | Pejsa | G06F 3/012 |
| 2022/0326837 A1* | 10/2022 | Dessero | G06T 19/003 |
| 2022/0383594 A1* | 12/2022 | Li | G06V 10/25 |
| 2023/0418375 A1* | 12/2023 | Noguchi | G02B 27/017 |

FOREIGN PATENT DOCUMENTS

| | | |
|---|---|---|
| EP | 3313114 A1 | 4/2018 |
| EP | 3413166 A1 | 12/2018 |
| EP | 3543961 A1 | 9/2019 |
| JP | 2000-259339 A | 9/2000 |
| JP | 2005-128877 A | 5/2005 |
| JP | 2018-078546 A | 5/2018 |
| JP | 2018081644 A | 5/2018 |
| JP | 2020-047006 A | 3/2020 |
| JP | 2020-523672 A | 8/2020 |
| JP | 2020-535879 A | 12/2020 |
| KR | 10-2019-0088466 A | 7/2019 |
| WO | 2018/092384 A1 | 5/2018 |
| WO | 2018/224725 A1 | 12/2018 |
| WO | 2019/067480 A1 | 4/2019 |

\* cited by examiner

FIG.14
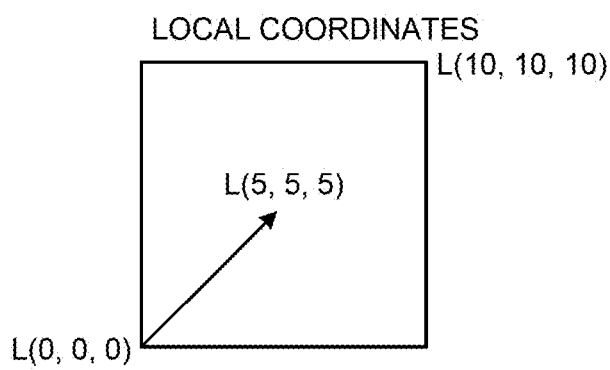
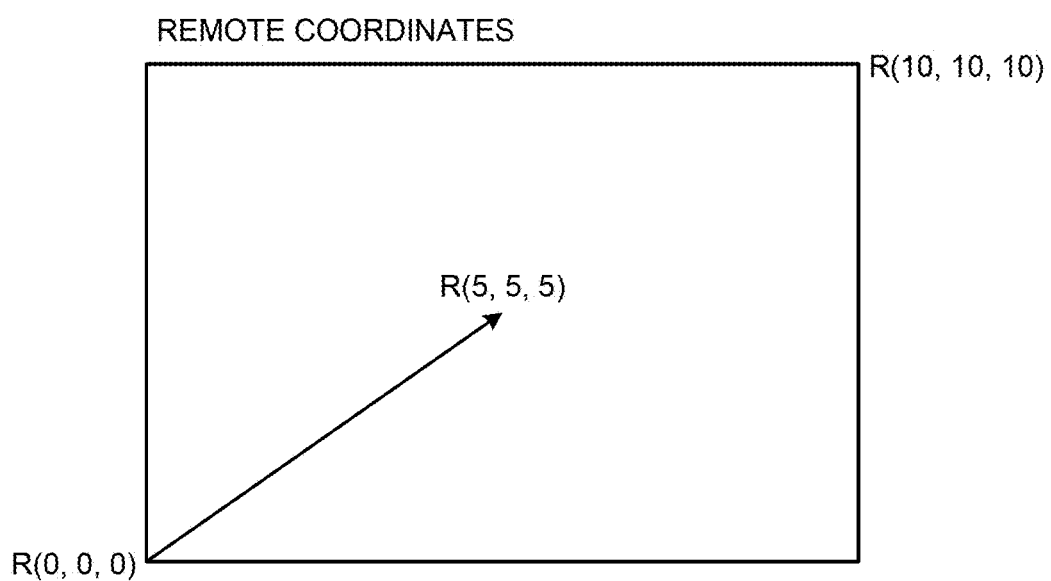

INFORMATION PROCESSING APPARATUS, INFORMATION PROCESSING PROGRAM, AND INFORMATION PROCESSING SYSTEM

CROSS-REFERENCE TO RELATED APPLICATION

The present application is based on PCT filing PCT/JP2021/019038, filed May 19, 2021, the entire contents of which is incorporated herein by reference.

FIELD

The present disclosure relates to an information processing apparatus, an information processing program, and an information processing system.

BACKGROUND

In recent years, virtual space technology has rapidly developed. By using the virtual space technology, the user can move in the virtual space displayed on the terminal device, for example, on the basis of movement information of a finger on the sensor.

CITATION LIST

Patent Literature

Patent Literature 1: JP 2000-259339 A

SUMMARY

Technical Problem

In recent years, services have started in which a user can virtually enter a space at a remote location (hereinafter, also referred to as a remote space) in real time. However, in conventional virtual space technology, the user only moves in the virtual reality space in which the remote space is copied using the sensor, and the user cannot effectively experience the remote space.

Therefore, the present disclosure proposes an information processing apparatus, an information processing program, and an information processing system that enables the user to effectively experience a remote space.

Solution to Problem

In order to solve the above problem, an information processing apparatus according to one embodiment of the present disclosure includes: an acquisition unit configured to acquire local space information indicating space information of a local space where a terminal device is located, local position information indicating position information of the terminal device in the local space, and remote space information indicating space information of a remote space located in a place different from the local space; and a generation unit configured to generate, on the basis of the local space information, the local position information, and the remote space information, information regarding a video to be displayed on the terminal device, the video being a virtual video in a case where the terminal device is at a position corresponding to the local position information in the remote space.

BRIEF DESCRIPTION OF DRAWINGS

FIG. 14 is a view illustrating a result of scale adjustment in the movement rate method.

DESCRIPTION OF EMBODIMENTS

Figure 1:
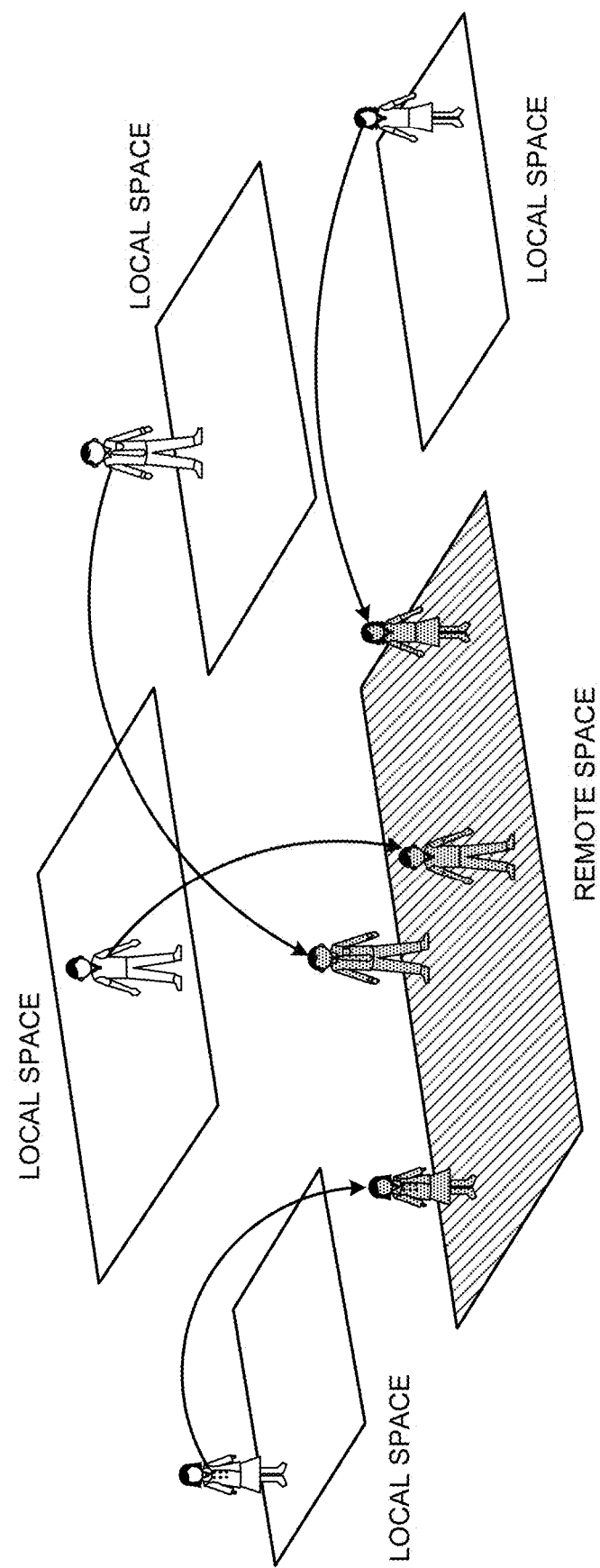
FIG. 1 is a diagram illustrating a local space and a remote space.

Hereinafter, embodiments of the present disclosure will be described in detail with reference to the drawings. In each of the following embodiments, the same parts are denoted by the same reference numerals, and redundant description will be omitted.

Furthermore, in the specification and the drawings, a plurality of configurations having substantially the same functional configuration may be distinguished from one another by adding different numbers after the same reference numeral. For example, a plurality of configurations having substantially the same functional configuration is distinguished as terminal devices 301, 302, and 303 as necessary. However, if it is not necessary to distinguish the plurality of constituent elements having substantially the same functional configuration from one another, only the same reference numeral is given. For example, in a case where it is not necessary to particularly distinguish the terminal devices 301, 302, and 303, they are simply referred to as terminal devices 30.

Further, the present disclosure will be described according to the following order of items.

1. Outline of Present Embodiment
2. Configuration of Information Processing System
2-1. Configuration of Server 2-2. Configuration of Imaging Device
2-3. Configuration of Terminal Device
3. Operation of Information Processing System
3-1. Transmission and Reception of Data
3-2. Method of Allocating Remote Space to Local Space
3-3. Setting Processing
3-4. First Generation Processing
3-5. Second Generation Processing
3-6. Application Example
4. Modification
5. Conclusion 1. Outline of Present Embodiment Services using next-generation communication technologies such as local 5G have been actively developed. Under such circumstances, a service has started in which a user can virtually enter, in real time, a space different from the local space (hereinafter, referred to as a remote space), such as a concert venue or a construction site, from a space where the user is currently located (referred to as a local space). However, in conventional virtual space technology, the user only moves in the virtual space in which the remote space is copied using the sensor, and the user cannot effectively experience the remote space.

In the case of using the service that enters a remote space from a local space, it is desirable for the user to secure a space having the same size as the remote space in the local space. If the remote space is a narrow space, there may be a case where a space having the same size as the remote space can be secured in the local space. However, in many cases, it is difficult to secure a space having the same size as the remote space in the local space.

FIG. 1 is a diagram illustrating a local space and a remote space. The local space is, for example, a space where the user is currently located, such as the user's own room or the user's office. Furthermore, the remote space is, for example, a space in a remote place different from the local space, such as a concert venue, an exhibition venue, a construction site, or an operating room. In the example of FIG. 1, there are four local spaces, and one user is located in each local space. The system of the present embodiment is a system for realizing the experience as if each user in a local space were in a remote space for real.

Figure 2:
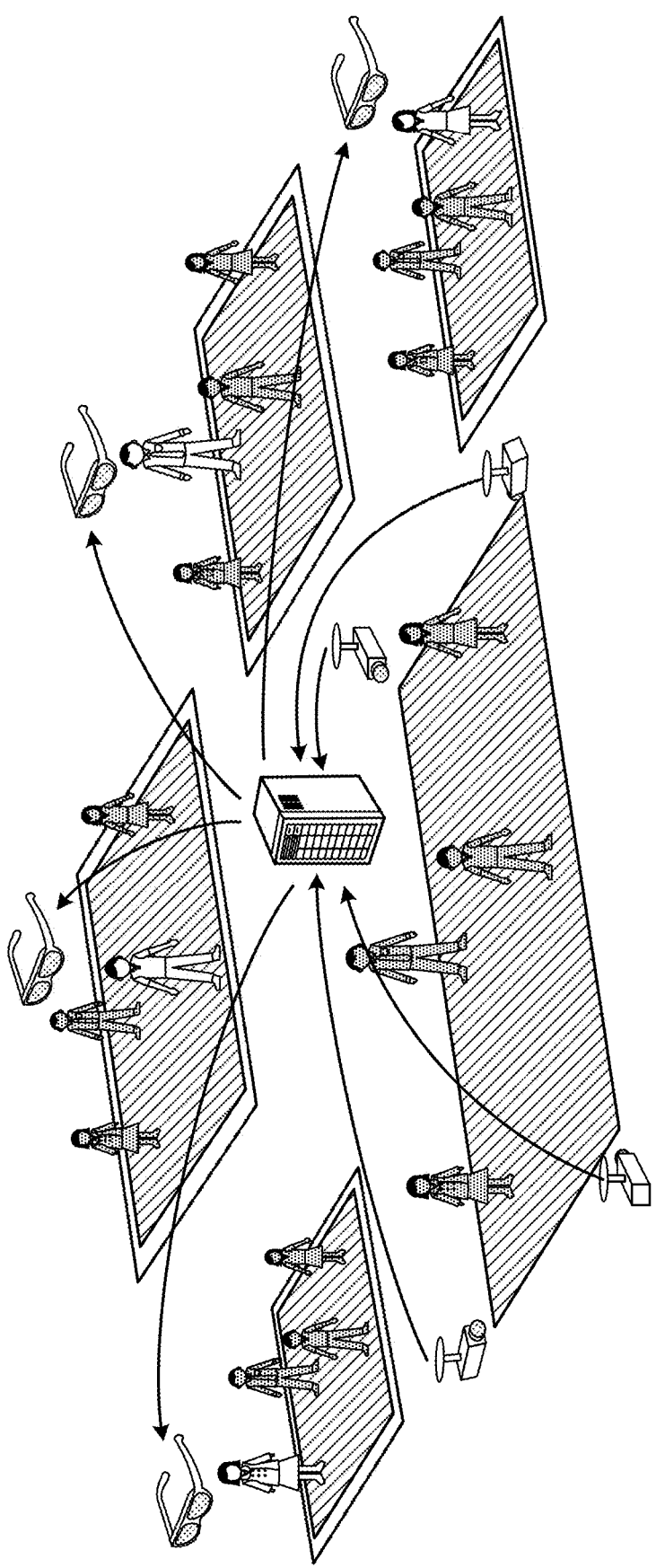
FIG. 2 is a diagram for explaining an outline of a system of the present embodiment.

FIG. 2 is a diagram for explaining an outline of the system of the present embodiment. In the present embodiment, a device for acquiring space information of the remote space, such as a camera or a 3D sensor (hereinafter, referred to as remote space information), is installed in the remote space. These devices are connected to a server via a network. The server obtains remote space information from these devices. Furthermore, in the present embodiment, a device (for example, a camera or a 3D sensor) that acquires space information of the local space (hereinafter, referred to as local space information) is also installed in each local space. The server obtains local space information from these devices.

In addition, each user located in the local space wears a terminal device such as an xR glass. Note that, since the user wears the terminal device and moves in the local space, it is safer if an obstacle in his/her own room can be seen. Therefore, the terminal device is desirably an AR type (optical see-through type) glass that superimposes a video on a real space. The terminal device has a function of detecting position information and/or posture information (hereinafter, referred to as position/posture information) of the user such as an acceleration sensor. The server acquires the position/posture information of the user from the terminal device.

The server generates control information for causing the terminal device to display the virtual video on the basis of the local space information, the local position information, and the remote space information. Here, the virtual video is a video in a case where the user is assumed to be at a position corresponding to the local position information in the remote space. The server sends the control information to the terminal device through the network. The terminal device superimposes and displays the virtual video on the real space on the basis of the control information. As a result, the user can experience as if he/she is in the remote space for real while staying in the local space.

Figure 3:
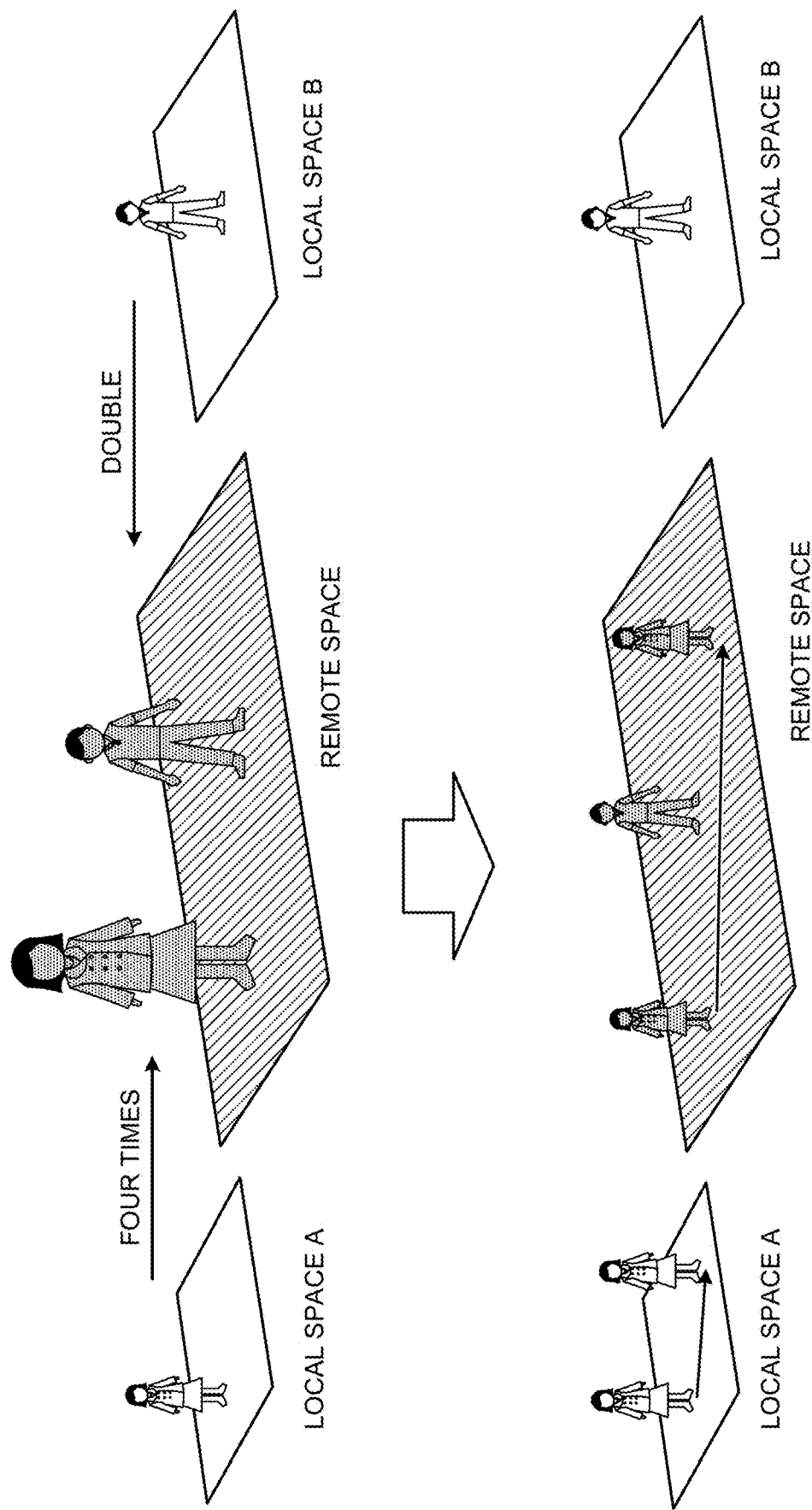
FIG. 3 is a diagram illustrating a state in which sizes of a local space and a remote space are matched.

In the example of FIG. 2, the plurality of local spaces are different in size. However, the size of the remote space is the same. Therefore, it is necessary to match the size of the local space with the size of the space at the site. FIG. 3 is a diagram illustrating a state in which sizes of the local space and the remote space are matched. In the upper part of FIG. 3, two local spaces A and B and one remote space are illustrated. In the example of FIG. 3, the size of the local space A is ¼ of the size of the remote space, and the size of the local space B is ½ of the size of the remote space. In the server, scales of the local space and the remote space are matched, but when scales of a person and an object are matched, sizes of the person and the object become very large as illustrated in an upper part of FIG. 3. This greatly impairs the experience quality of the user.

Therefore, the server of the present embodiment changes the movement amount of the user according to the scale (ratio between the local space and the remote space) without changing the scale of the person or the object. For example, in the case of a scale of four times, four times the movement amount of the user in the local space is the movement amount of the user in the remote space. In general, human activities are more often performed in a stationary state because movement of a position is temporary. Changing the size of a person or an object always causes a feeling of strangeness. In the present embodiment, the moving speed is changed without changing the scale of the person or the object. The influence of changing the moving speed is limited to the time of movement, and is also limited on the time axis. As a result, since the user's feeling of strangeness is suppressed, the user can effectively experience the remote space.

Figure 4:
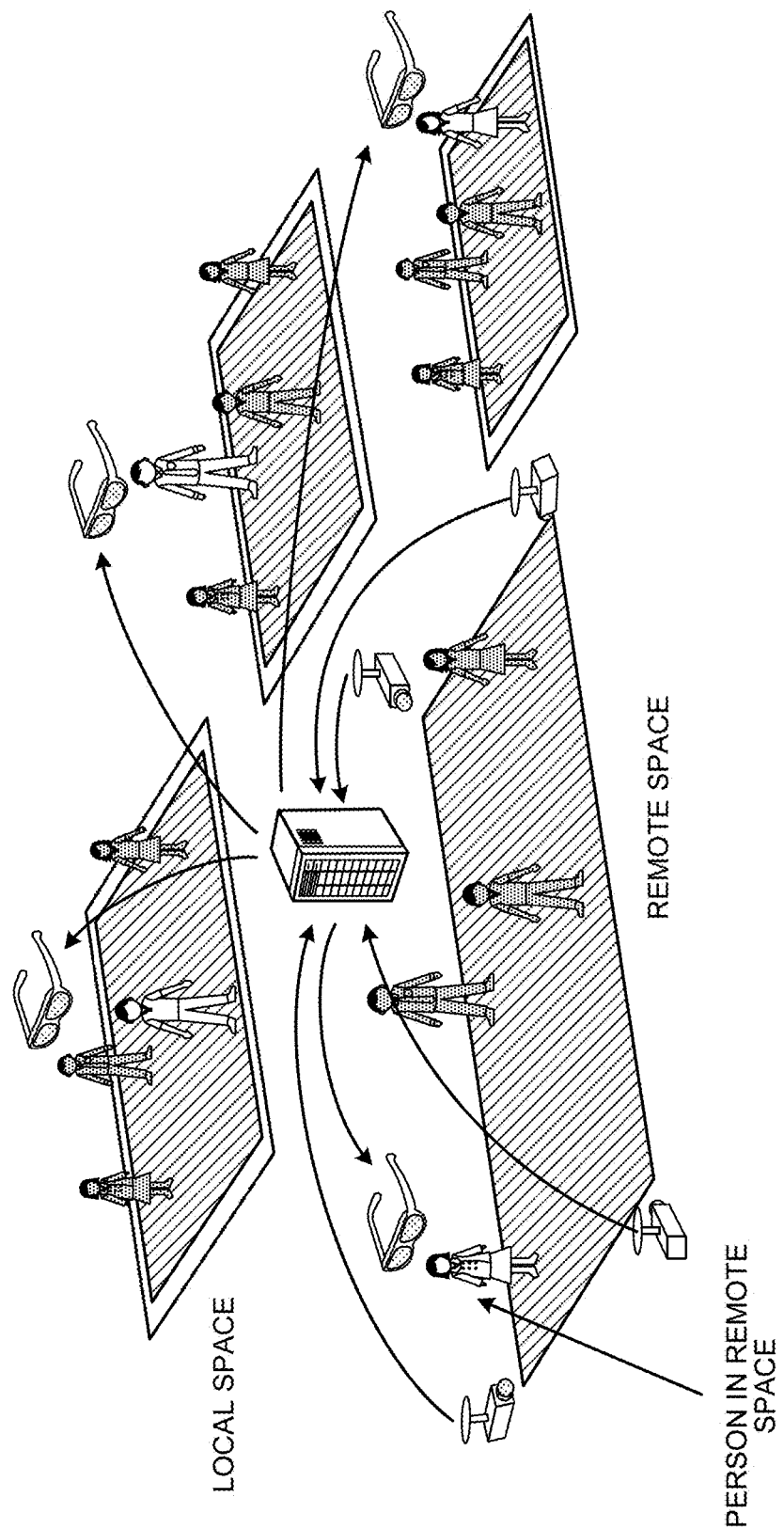
FIG. 4 is a diagram illustrating a state in which one of users is in a remote space.

Note that, in the example of FIG. 3, all the plurality of users are in the local space, but some of the plurality of users may be in the remote space. FIG. 4 is a diagram illustrating a state in which one of users is in the remote space. In this case, while the magnification of the movement amount of the person in the remote space remains one time, only the magnification of the movement amount of the user in the local space changes according to the scale.

The outline of the present embodiment has been described above, and an information processing system 1 according to the present embodiment will be described in detail below.

2. Configuration of Information Processing System

First, an overall configuration of the information processing system 1 will be described.

Figure 5:
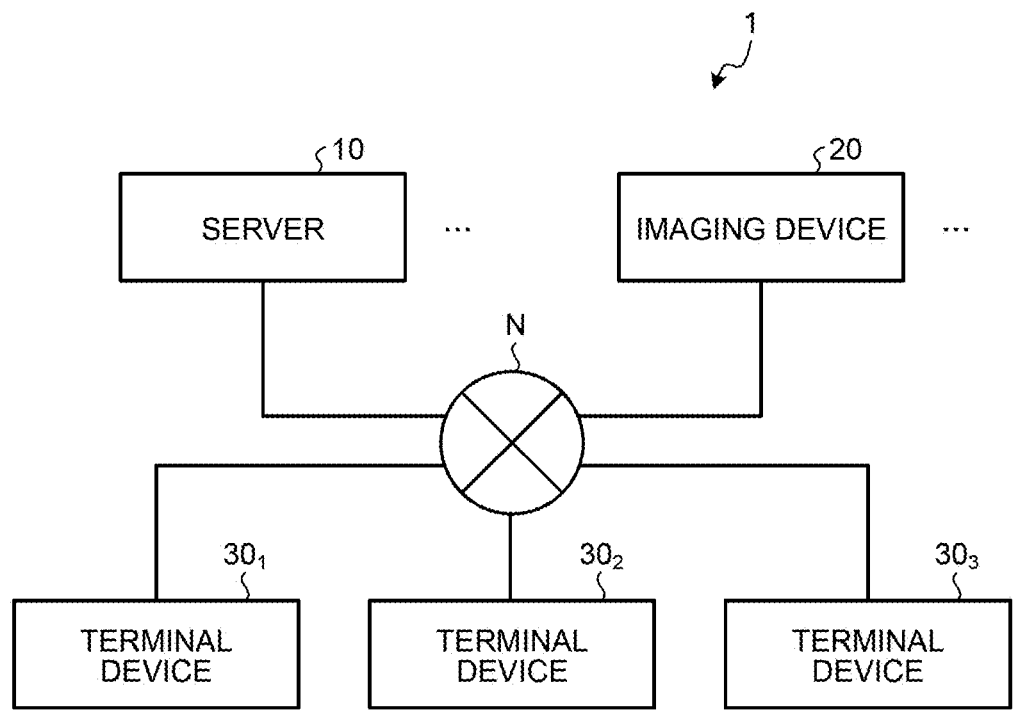
FIG. 5 is a diagram illustrating a configuration example of an information processing system according to the embodiment of the present disclosure.

FIG. 5 is a diagram illustrating a configuration example of the information processing system 1 according to the embodiment of the present disclosure. The information processing system 1 is a system for providing a user located in a local space with the experience of being in a remote space. The information processing system 1 includes a server 10, an imaging device 20, and a terminal device 30. Note that the devices in the drawings may be considered as devices in a logical sense. That is, a part of the device in the drawing may be realized by a virtual machine (VM), a container, a docker, or the like, and they may be implemented on physically the same hardware.

The server 10, the imaging device 20, and the terminal device 30 each have a communication function and are connected via a network N. The server 10, the imaging device 20, and the terminal device 30 can be rephrased with communication devices. Although only one network N is illustrated in the example of FIG. 5, a plurality of networks N may exist.

Here, the network N is a communication network such as a local area network (LAN), a wide area network (WAN), a cellular network, a fixed-line network, a regional Internet protocol (IP) network, and the Internet. The network N may include wired or wireless networks. In addition, the network N may include a core network. The core network is, for example, an evolved packet core (EPC) or a 5G core network (5GC). In addition, the network N may include a data network other than the core network. The data network may be a service network of a telecommunications carrier, for example, an IP Multimedia Subsystem (IMS) network. Furthermore, the data network may be a private network such as an intra-company network.

The communication device such as the server 10, the imaging device 20, and the terminal device 30 may be configured to be connected to the network N or other communication devices using a radio access technology (RAT) such as long term evolution (LTE), new radio (NR), Wi-Fi, or Bluetooth (registered trademark). At this time, the communication device may be configured to be able to use different radio access technologies. For example, the communication device may be configured to be able to use NR and Wi-Fi. Furthermore, the communication device may be configured to be able to use different cellular communication technologies (for example, LTE and NR). LTE and NR are a type of cellular communication technology, and enable mobile communication of a communication device by arranging a plurality of areas covered by a base station in a cell shape.

Note that the communication devices such as the server 10, the imaging device 20, and the terminal device 30 may be connectable to the network N or other communication devices using a radio access technology other than LTE, NR, Wi-Fi, or Bluetooth. For example, the communication device may be connectable to the network N or other communication devices by using low power wide area (LPWA) communication. Furthermore, the communication device may be connectable to the network N or other communication devices by using wireless communication of a proprietary standard. Of course, the communication device may be connectable to the network N or other communication devices by using wireless communication of other known standards.

Hereinafter, a configuration of each device constituting the information processing system 1 will be specifically described. Note that the configuration of each device described below is merely an example. The configuration of each device may be different from the following configuration.

2-1. Configuration of Server

First, a configuration of the server 10 will be described.

The server 10 is an information processing apparatus (computer) that performs processing for providing an experience as if the user located in the local space is in the remote space for real. Any form of computer can be employed as the server 10. For example, the server 10 may be a PC server, a midrange server, or a mainframe server. Furthermore, the server 10 may be an information processing apparatus that performs data processing (edge processing) near the user or the terminal. For example, it may be an information processing apparatus (computer) attached to or built in a base station or a roadside unit. Of course, the server 10 may be an information processing apparatus that performs cloud computing.

Figure 6:
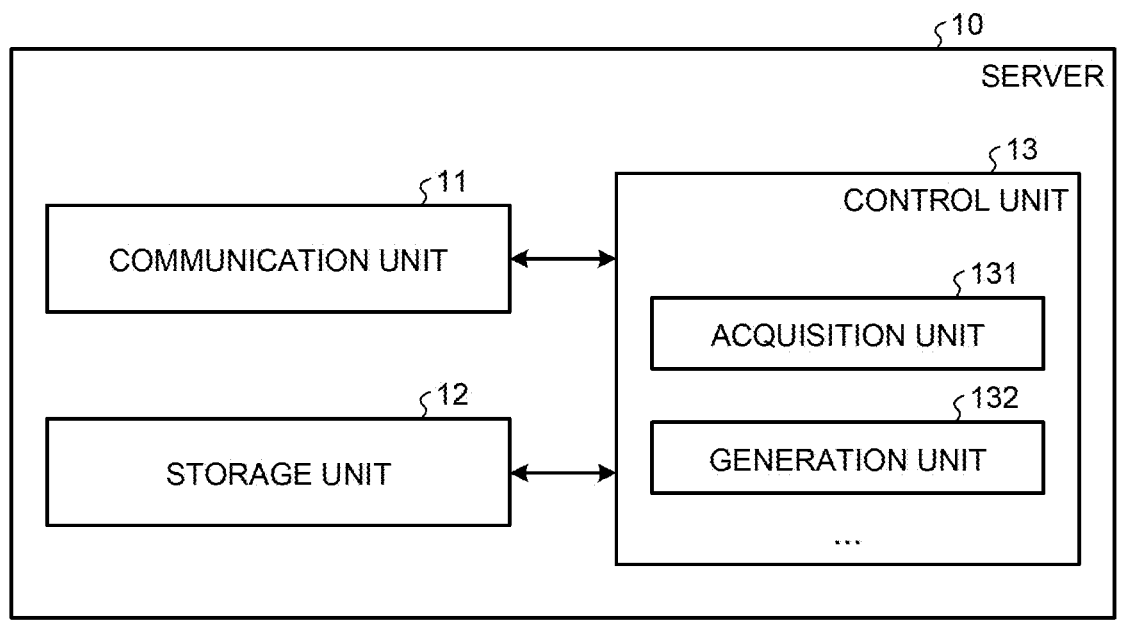
FIG. 6 is a diagram illustrating a configuration example of a server according to the embodiment of the present disclosure.

FIG. 6 is a diagram illustrating a configuration example of the server 10 according to the embodiment of the present disclosure. The server 10 includes a communication unit 11, a storage unit 12, and a control unit 13. Note that the configuration illustrated in FIG. 6 is a functional configuration, and the hardware configuration may be different from this functional configuration. Furthermore, the functions of the server 10 may be implemented in a distributed manner in a plurality of physically separated configurations. For example, the server 10 may include a plurality of server devices.

The communication unit 11 is a communication interface for communicating with other devices. For example, the communication unit 11 is a local area network (LAN) interface such as a network interface card (NIC). The communication unit 11 may be a wired interface or a wireless interface. The communication unit 11 communicates with the imaging device 20, the terminal device 30, and the like under the control of the control unit 13.

The storage unit 12 is a data readable/writable storage device such as a dynamic random access memory (DRAM), a static random access memory (SRAM), a flash memory, or a hard disk. The storage unit 12 functions as a storage unit of the server 10.

Returning to FIG. 6, the control unit 13 is a controller that controls each unit of the server 10. The control unit 13 is implemented by, for example, a processor such as a central processing unit (CPU), a micro processing unit (MPU), or a graphics processing unit (GPU). For example, the control unit 13 is implemented by a processor executing various programs stored in a storage device inside the server 10 using a random access memory (RAM) or the like as a work area. Furthermore, the control unit 13 may be implemented by, for example, an integrated circuit such as an application specific integrated circuit (ASIC) or a field programmable gate array (FPGA). Any of the CPU, the MPU, the GPU, the ASIC, and the FPGA can be regarded as a controller.

The control unit 13 includes an acquisition unit 131 and a generation unit 132. Each block (the acquisition unit 131 to the generation unit 132) constituting the control unit 13 is a functional block indicating a function of the control unit 13. These functional blocks may be software blocks or hardware blocks. For example, each of the functional blocks described above may be one software module realized by software (including microprograms), or may be one circuit block on a semiconductor chip (die). Of course, each functional block may be one processor or one integrated circuit. The control unit 13 may be configured by a functional unit different from the above-described functional block. A configuration method of the functional block is arbitrary.

Note that the control unit 13 may be configured by a functional unit different from the above-described functional block. In addition, some or all of the operations of the blocks (the acquisition unit 131 to the generation unit 132) constituting the control unit 13 may be performed by other devices. For example, some or all of the operations of the blocks constituting the control unit 13 may be performed by a control unit 23 of the imaging device 20 or a control unit 33 of the terminal device 30. The operation of each block constituting the control unit 13 will be described later.

2-2. Configuration of Imaging Device

Next, a configuration of the imaging device 20 will be described.

The imaging device 20 is an information processing apparatus (computer) having an imaging function. The imaging device 20 is installed in a remote space and transmits a captured image of the remote space to the server 10.

Figure 7:
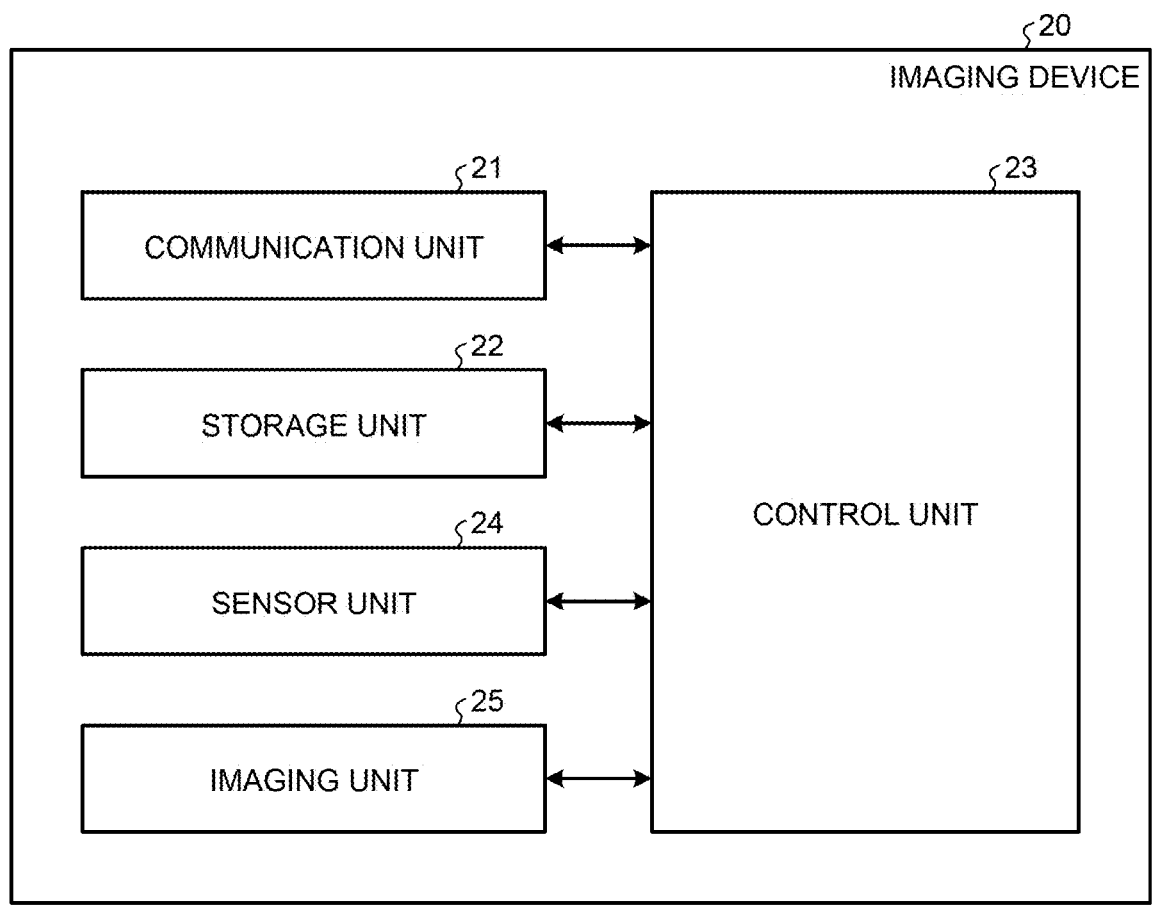
FIG. 7 is a diagram illustrating a configuration example of an imaging device according to the embodiment of the present disclosure.

FIG. 7 is a diagram illustrating a configuration example of the imaging device 20 according to the embodiment of the present disclosure. The imaging device 20 includes a communication unit 21, a storage unit 22, a control unit 23, a sensor unit 24, and an imaging unit 25. Note that the configuration illustrated in FIG. 7 is a functional configuration, and the hardware configuration may be different from this functional configuration. Furthermore, the functions of the imaging device 20 may be implemented in a distributed manner in a plurality of physically separated configurations.

The communication unit 21 is a communication interface for communicating with other devices. For example, the communication unit 21 is a LAN interface such as an NIC. The communication unit 21 may be a wired interface or a wireless interface.

In a case where the communication unit 21 includes a wireless interface, the communication unit 21 may be configured to connect to the network N using a wireless access technology such as LTE, NR, Wi-Fi, or Bluetooth (registered trademark). At this time, the communication device may be configured to be able to use different radio access technologies. For example, the communication device may be configured to be able to use NR and Wi-Fi. Furthermore, the communication device may be configured to be able to use different cellular communication technologies (for example, LTE and NR). In addition, the imaging device 20 may be connectable to the network N using a radio access technology other than LTE, NR, Wi-Fi, and Bluetooth.

The storage unit 22 is a storage device capable of reading and writing data, such as a DRAM, an SRAM, a flash memory, or a hard disk. The storage unit 22 functions as a storage unit of the imaging device 20. The storage unit 22 stores captured data (for example, image data or metadata) captured by the imaging unit 25. Note that the captured data may be in a file format.

The control unit 23 is a controller that controls each unit of the imaging device 20. The control unit 23 is implemented by, for example, a processor such as a CPU, an MPU, or a GPU. For example, the control unit 23 is implemented by a processor executing various programs stored in a storage device inside the imaging device 20 using a RAM or the like as a work area. Note that the control unit 23 may be implemented by an integrated circuit such as an ASIC or an FPGA. Any of the CPU, the MPU, the GPU, the ASIC, and the FPGA can be regarded as a controller.

The sensor unit 24 is a sensor that detects information regarding a remote space. For example, the sensor unit 24 is a 3D sensor that detects the shape of the remote space and the position, shape, and the like of an object in the remote space. At this time, the sensor unit 24 may be a time-of-flight (ToF) camera type 3D sensor or a stereo-camera type 3D sensor.

The imaging unit 25 is a conversion unit that converts an optical image into an electric signal. The imaging unit 25 includes, for example, an image sensor, a signal processing circuit that processes an analog pixel signal output from the image sensor, and the like, and converts light entering from the lens into digital data (image data). Note that the image captured by the imaging unit 25 is not limited to a video (moving image), and may be a still image. Note that the imaging unit 25 can be rephrased as a camera.

2-3. Configuration of Terminal Device

Next, a configuration of the terminal device 30 will be described.

The terminal device 30 is an information processing apparatus configured to be able to communicate with the server 10. For example, the terminal device 30 is an xR device such as an augmented reality (AR) device, a virtual reality (VR) device, or a mixed reality (MR) device. At this time, the xR device may be a glasses-type device such as AR glasses or MR glasses, or may be a head-mounted device such as a VR head-mounted display. In a case where the terminal device 30 is an xR device, the terminal device 30 may be a standalone device including only a user wearing portion (for example, the eyeglass portion). Furthermore, the terminal device 30 may be a terminal interlocking device including a user wearing portion (for example, the eyeglass portion) and a terminal portion (for example, a smart device) interlocked with the user wearing portion.

Note that the terminal device 30 may be a mobile terminal such as a mobile phone, a smart device (smartphone or tablet), a personal digital assistant (PDA), or a notebook PC. Furthermore, the terminal device 30 may be a wearable device such as a smart watch. In addition, the terminal device 30 may be a portable Internet of Things (IoT) device.

Figure 8:
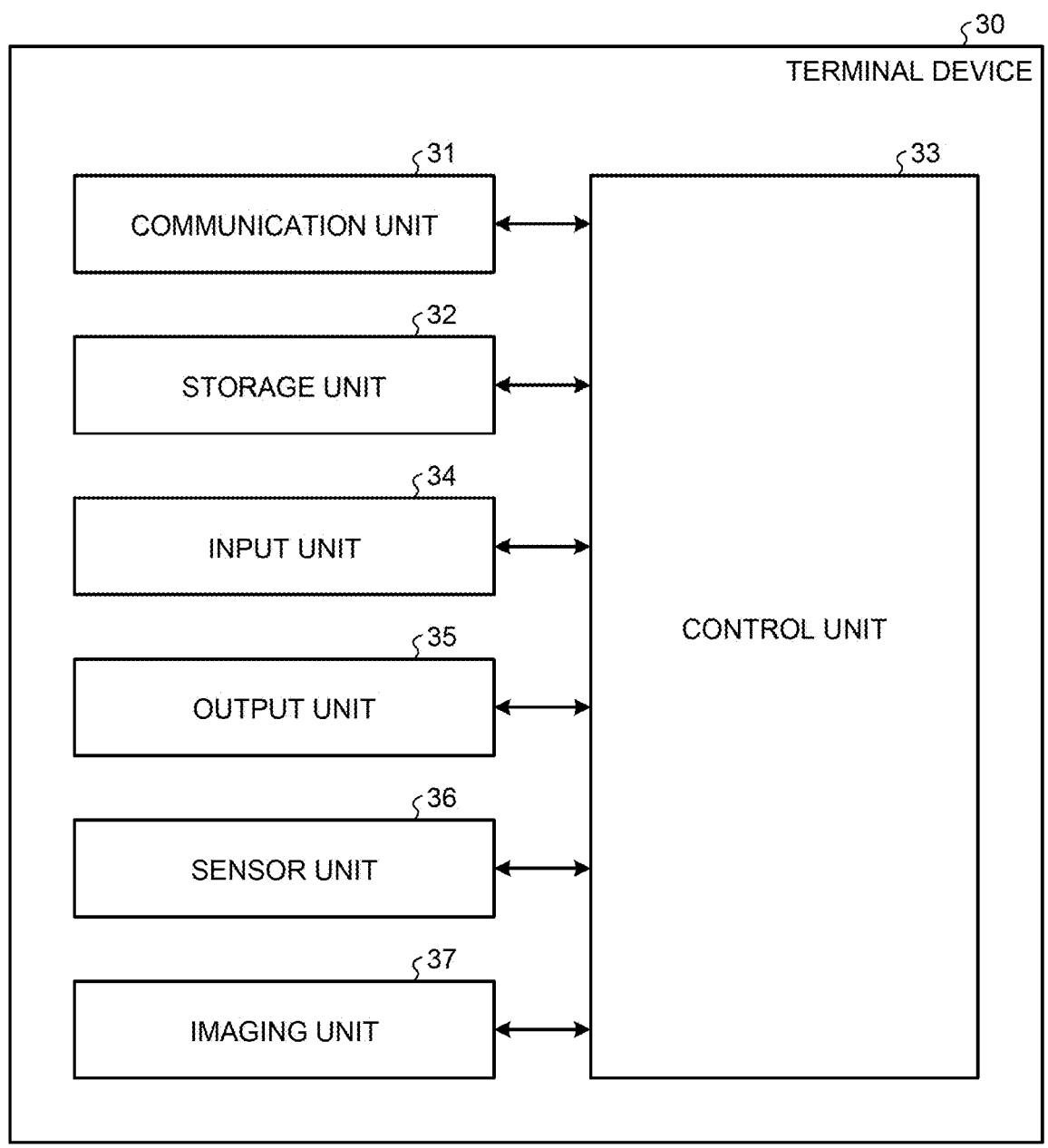
FIG. 8 is a diagram illustrating a configuration example of a terminal device according to the embodiment of the present disclosure.

FIG. 8 is a diagram illustrating a configuration example of the terminal device 30 according to the embodiment of the present disclosure. The terminal device 30 includes a communication unit 31, a storage unit 32, a control unit 33, an input unit 34, an output unit 35, a sensor unit 36, and an imaging unit 37. Note that the configuration illustrated in FIG. 8 is a functional configuration, and the hardware configuration may be different from this functional configuration. Furthermore, the functions of the terminal device 30 may be implemented in a distributed manner in a plurality of physically separated configurations.

The communication unit 31 is a communication interface for communicating with other devices. For example, the communication unit 31 is a LAN interface such as an NIC. Further, the communication unit 31 may be a wired interface or a wireless interface. If the communication unit 31 includes a wireless interface, the communication unit 31 may be configured to be connected to the network N or other communication devices using a radio access technology (RAT) such as long term evolution (LTE), new radio (NR), Wi-Fi, or Bluetooth (registered trademark). The communication unit 31 communicates with the server 10, the imaging device 20, and the like under the control of the control unit 33.

The storage unit 32 is a storage device capable of reading and writing data, such as a DRAM, an SRAM, a flash memory, or a hard disk. The storage unit 32 functions as a storage unit of the terminal device 30.

The control unit 33 is a controller that controls each unit of the terminal device 30. The control unit 33 is implemented by, for example, a processor such as a CPU, an MPU, or a GPU. For example, the control unit 33 is implemented by a processor executing various programs stored in a storage device inside the terminal device 30 using a RAM or the like as a work area. Note that the control unit 33 may be implemented by an integrated circuit such as an ASIC or an FPGA. Any of the CPU, the MPU, the GPU, the ASIC, and the FPGA can be regarded as a controller.

The input unit 34 is an input device that receives various external inputs. For example, the input unit 34 is an operation device, such as a keyboard, a mouse, and operation keys, for the user to perform various operations. Note that, in a case where a touch panel is adopted to the terminal device 30, the touch panel is also included in the input unit 34. In this case, the user performs various operations by touching the screen with a finger or a stylus.

The output unit 35 is a device that performs various outputs such as sound, light, vibration, and an image to the outside. The output unit 35 includes a display device that displays various types of information. The display device is, for example, a liquid crystal display or an organic electro luminescence (EL) display. Note that, in a case where a touch panel is adopted to the terminal device 30, the display device may be a device integrated with the input unit 34. Furthermore, in a case where the terminal device 30 is an xR device (for example, AR/MR glasses), it may be a transmission type device that projects an image on a glass, or may be a retina projection type device that directly projects an image on the retina of the user. The output unit 35 performs various outputs to the user under the control of the control unit 33.

The sensor unit 36 is a sensor that acquires information regarding the position or posture of the terminal device 30. For example, the sensor unit 36 is an acceleration sensor. Note that the sensor unit 36 is not limited to the acceleration sensor. The sensor unit 36 may be an inertial measurement unit (IMU), a geomagnetic sensor, or a 3D sensor. Furthermore, the sensor unit 36 may be a global navigation satellite system (GNSS) sensor. The GNSS sensor may be a global positioning system (GPS) sensor, a GLONASS sensor, a Galileo sensor, or a quasi-zenith satellite system (QZSS) sensor. Furthermore, the sensor unit 36 may be a combination of these sensors.

The imaging unit 37 is a conversion unit that converts an optical image into an electric signal. The imaging unit 37 includes, for example, an image sensor, a signal processing circuit that processes an analog pixel signal output from the image sensor, and the like, and converts light entering from the lens into digital data (image data). Note that the image captured by the imaging unit 37 is not limited to a video (moving image), and may be a still image. Note that the imaging unit 37 can be rephrased as a camera.

3. Operation of Information Processing System

The configuration of the information processing system 1 has been described above, and next, the operation of the information processing system 1 will be described.

3-1. Transmission and Reception of Data

Figure 9:
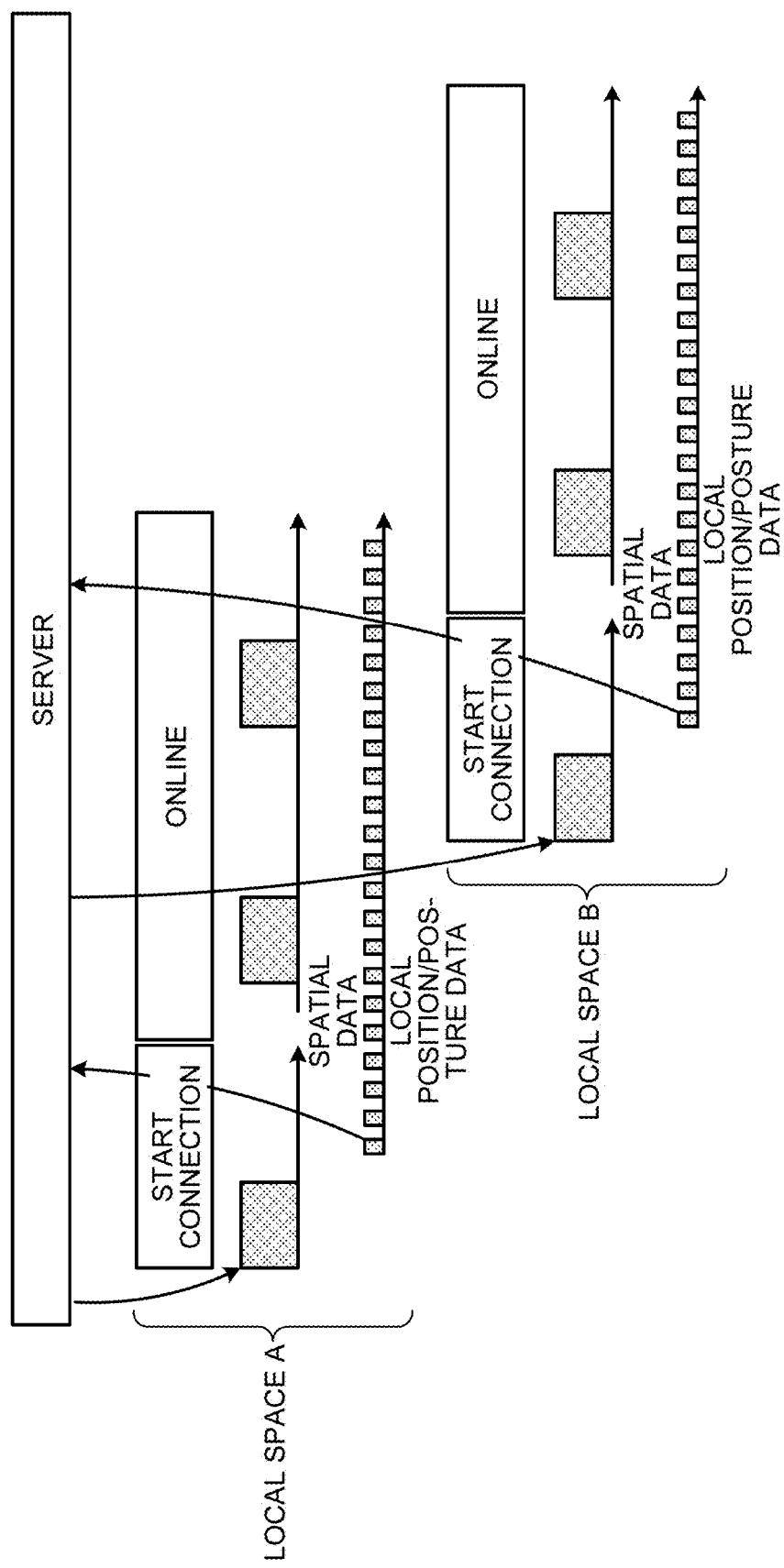
FIG. 9 is a diagram for explaining transmission and reception of data.

First, transmission and reception of data will be described. FIG. 9 is a diagram for explaining transmission and reception of data.

First, the server 10 acquires remote space information from the imaging device 20 installed in a remote space. The remote space information is three-dimensional information of the remote space. The remote space information may include information of an area size of the remote space (for example, information on the size of each of length, width, and height of the remote space).

Furthermore, when the terminal device 30 located in the local space A starts connection to the server 10, the server 10 acquires local space information from the terminal device 30 located in the local space A (or a sensor installed in the local space A). The local space information is three-dimensional information of the local space. The local space information may include information of an area size of the local space (for example, information on the size of each of length, width, and height of the local space).

Then, on the basis of the local space information of the local space A and the remote space information, the server 10 generates information regarding a virtual video for the first time after the start of connection. The information regarding the virtual video is spatial data of the remote space (for example, three-dimensional data of the remote space) for the terminal device 30 to generate the virtual video. Then, the server 10 transmits the spatial data of the remote space to the terminal device 30 located in the local space A. The terminal device 30 generates and displays a virtual video on the basis of the spatial data.

Furthermore, the server 10 acquires the position/posture information of the user from the terminal device 30 located in the local space A (or a sensor installed in the local space A). The position/posture information is information on the position and/or posture of the user. Note that, in the following description, the position information of the user may be referred to as local position information.

Then, on the basis of the local space information of the local space A, the remote space information, and the position/posture information of the user, the server 10 generates information regarding a virtual video. For example, the server 10 generates spatial data of a remote space. The virtual video created here is a video that is the user's field of view in a case of assuming the user is in the remote space. Then, the server 10 transmits the spatial data of the remote space to the terminal device 30 located in the local space A. The terminal device 30 generates and displays a virtual video on the basis of the spatial data.

Furthermore, when the terminal device 30 located in the local space B starts connection to the server 10, the server 10 acquires local space information from the terminal device 30 located in the local space B (or a sensor installed in the local space B).

Then, on the basis of the local space information of the local space B and the remote space information, the server 10 generates information regarding a virtual video for the first time after the start of connection. The information regarding the virtual video is spatial data of the remote space for the terminal device 30 to generate the virtual video. Then, the server 10 transmits the spatial data of the remote space to the terminal device 30 located in the local space B. The terminal device 30 generates and displays a virtual video on the basis of the spatial data.

Furthermore, the server 10 acquires the position/posture information of the user from the terminal device 30 located in the local space B (or a sensor installed in the local space B).

Then, on the basis of the local space information of the local space B, the remote space information, and the position/posture information of the user, the server 10 generates information regarding a virtual video. For example, the server 10 generates spatial data of a remote space. Then, the server 10 transmits the spatial data of the remote space to the terminal device 30 located in the local space B. The terminal device 30 generates and displays a virtual video on the basis of the spatial data.

Note that the server 10 repeats transmission of the spatial data and reception of the position/posture information at regular time intervals. The transmission of the spatial data is, for example, at 1 s intervals, and the data transmission requires, for example, 38 mbps. Furthermore, transmission of the position/posture data is performed at intervals of 1 ms, for example, and the data transmission requires, for example, 0.1 mbps.

Note that the transmission of the spatial data is not necessarily reliable. The terminal device 30 can generate the virtual video without updating the spatial data. However, if the position/posture information is missing, the virtual video becomes extremely unnatural. For example, there is a problem that the video is not updated even though the user is moving. Therefore, the server 10 performs priority control of transmission of the position/posture information by, for example, QoS control or the like, and realizes real-time interaction even in a situation where the communication environment is poor.

In 5G, a concept of network slicing is introduced to provide communication services optimized for various communication characteristics according to use cases. Here, the network slicing is a concept constituting a network slice, and the network slice is logical resource partitioning for virtually separating and managing and/or operating network functions. For example, in the network slice, an operation of changing the unit of sending data according to the use of the virtually separated slice is considered. In the following description, a network slice may be simply referred to as a slice.

The server 10 of the present embodiment may transmit or receive the local position information and the spatial data using different network slices. At this time, the server 10 may set the slice used for the communication of the local position information to have a lower delay than the slice used for the communication of the spatial data. For example, the server 10 may set the slice used for the communication of the local position information as a slice of an Ultra-Reliable and Low Latency Communications (URLLC) type, and set the slice used for the communication of the spatial data as a slice of an enhanced mobile broadband (eMBB) type.

3-2. Method of Allocating Remote Space to Local Space

There are roughly two methods for allocating the local space to the remote space. One is a movement rate method (first method), and the other is a division method (second method).

Figure 10:
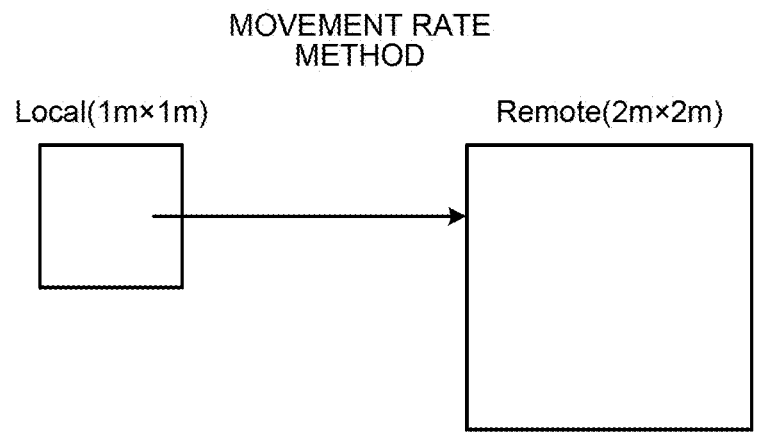
FIG. 10 is a diagram for explaining a movement rate method.

FIG. 10 is a diagram for explaining the movement rate method. The movement rate method is a method of allocating the local space to the remote space by enlarging or reducing the scale of the remote space or the local space. In the movement rate method, the server 10 calculates a virtual movement amount of the user according to enlargement or reduction of the scale. For example, it is assumed that the local space is a space having a size of 1 m×1 m and the remote space is a space having a size of 2 m×2 m. In this case, the size of the space obtained by doubling the vertical and horizontal dimensions of the local space is the same as the size of the remote space. Therefore, the server 10 doubles the movement amount of the user in the local space as the movement amount of the user in the remote space. In a case where the sizes of the local space and the remote space are close to each other, this mechanism that corrects only the difference in space is easy to use. When the movement rate method is used, the user has a completely free viewpoint with respect to the remote space.

Figure 11:
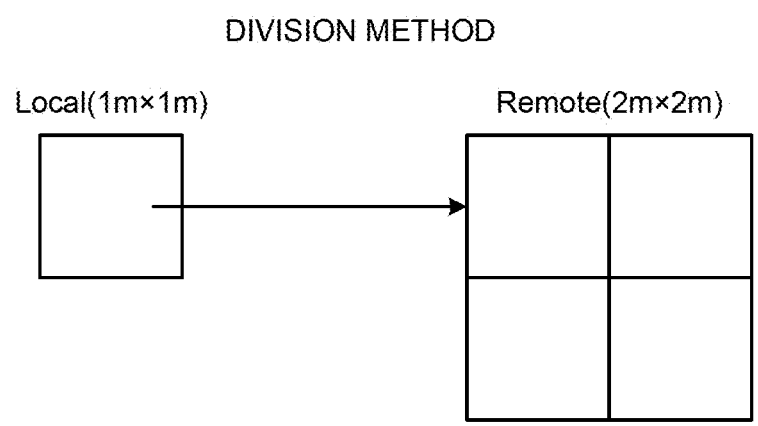
FIG. 11 is a diagram for explaining a division method.

FIG. 11 is a diagram for explaining the division method. The division method is a method of dividing the remote space or the local space according to the other space. In this case, the local space is allocated to one divided space of the remote space. In a case where the remote space is divided by the size of the local space, the movement amount of the user in the local space is the movement amount of the user in the remote space as it is. In the division method, the user can move only a part of the remote space. In a case where the remote space and the local space are greatly different in scale, only a part of the remote space can be moved. The user enjoys the remote space in view. The allocation of the remote space can be performed by the user performing a predetermined operation such as a button operation in the case of moving out of the range. Note that, for example, in a case where the sizes of the local space and the remote space are greatly different, such as a case where the remote space is a live venue, this mechanism is easy to use. When the division method is used, the user has a free viewpoint within a specific range in the remote space.

3-3. Setting Processing

Figure 12:
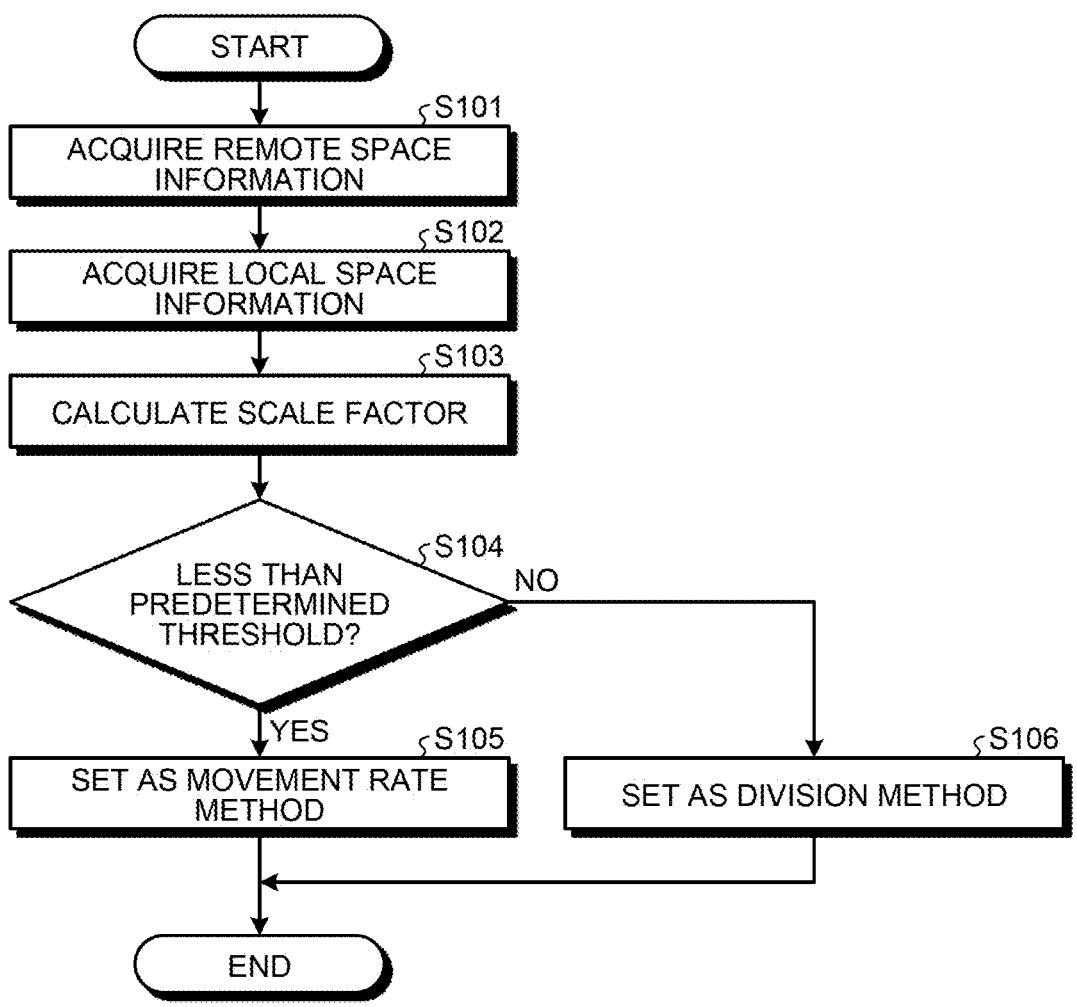
FIG. 12 is a flowchart for explaining setting processing.

Next, setting processing will be described. When there is a connection from the terminal device 30, the server 10 performs a setting processing related to a method of allocating a local space to a remote space. FIG. 12 is a flowchart for explaining the setting processing. The setting processing is executed by the control unit 13 of the server 10. The setting processing will be described below with reference to the flowchart of FIG. 12.

First, the acquisition unit 131 of the server 10 acquires remote space information from the imaging device 20 (or a server that manages the imaging device 20) installed in the remote space (step S101). The remote space information includes information on the area size of the remote space. For example, the remote space information includes information ($X_R$, $Y_R$, $Z_R$) of length, width, and height of the remote space. In addition, the remote space information may include information on the shape and area of the remote space.

Subsequently, the acquisition unit 131 of the server 10 acquires local space information from the terminal device 30 located in the local space (or a sensor set in the local space) (step S102). The local space information includes information on the area size of the local space. For example, the local space information includes information of length, width, and height of the local space ($X_L$, $Y_L$, $Z_L$). In addition, the local space information may include information on the shape and area of the local space.

Next, the generation unit 132 of server 10 compares the area size of the local space with the area size of the remote space. Specifically, the generation unit 132 calculates a scale ratio for allocating the local space to the remote space on the basis of the information on the area size of the local space and the information on the area size of the remote space (step S103). The scale ratio may be, for example, a ratio of the vertical and horizontal sizes of the local space and the remote space. For example, when the vertical and horizontal sizes of the remote space are $X_R$ and $Y_R$, respectively, and the vertical and horizontal sizes of the local space are $X_L$ and $Y_L$, respectively, the scale ratios $D_X$ and $D_Y$ of the vertical and horizontal directions are expressed by the following equations (1) and (2).

$$D_X = X_R/X_L \quad (1)$$

$$D_Y = Y_R/Y_L \quad (2)$$

Subsequently, the generation unit 132 determines a method of allocating the remote space to the local space on the basis of a comparison result between the area size of the local space and the area size of the remote space. For example, the generation unit 132 determines whether the allocation method of the remote space to the local space is the movement rate method or the division method on the basis of the scale ratios $D_X$ and $D_Y$ calculated in step S103 (step S104).

For example, in a case where the difference in size between the local space and the remote space is smaller than a predetermined threshold value, the generation unit 132 sets the allocation method to the movement rate method. For example, when both the scale ratios $D_X$ and $D_Y$ are less than the predetermined threshold value (step S104: Yes), the generation unit 132 sets the allocation method as the movement rate method. The predetermined threshold value is, for example, 1.2 (120%). In this case, the generation unit 132 performs setting regarding the virtual movement amount of the terminal device 30 in the remote space (step S105). For example, the generation unit 132 sets the virtual movement amount in the remote space in a case where the user moves in the local space as the movement amount obtained by multiplying the movement amount in the local space by the scale ratio.

On the other hand, in a case where the difference in size between the local space and the remote space is equal to or larger than a predetermined threshold value (or larger than a predetermined threshold), the generation unit 132 sets the allocation method to the division method. For example, when one of the scale ratios $D_X$ and $D_Y$ is equal to or larger than the predetermined threshold value (alternatively, both of the scale ratios $D_X$ and $D_Y$) (step S104: No), the generation unit 132 sets the allocation method as the division method. The predetermined threshold value is, for example, 1.2 (120%). In this case, the generation unit 132 performs setting regarding the virtual movement amount of the terminal device 30 in the remote space (step S106). For example, the generation unit 132 sets the virtual movement amount in the remote space in a case where the user moves in the local space as the movement amount in the local space as it is.

When the setting regarding the virtual movement amount is completed, the server 10 ends the setting processing.

3-4. First Generation Processing

Figure 13:
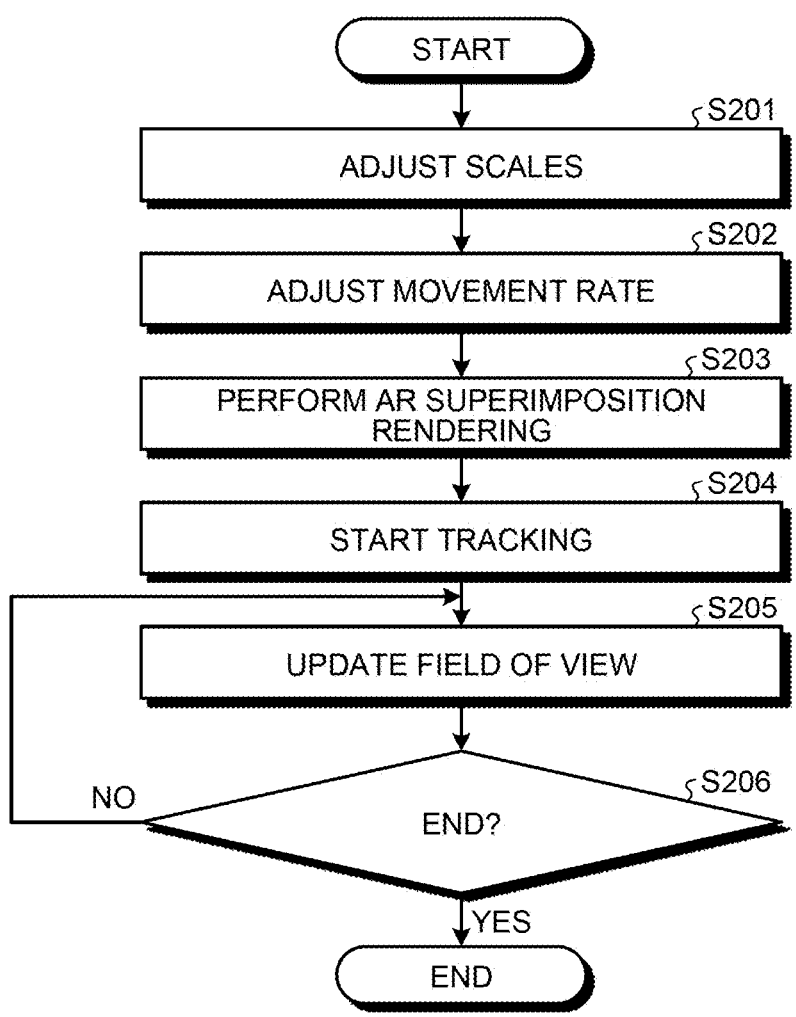
FIG. 13 is a flowchart for explaining a first generation processing.

Next, virtual video generation processing based on the movement rate method (first generation processing) will be described. FIG. 13 is a flowchart for explaining the first generation processing. In the following description, it is assumed that the server 10 generates a virtual video to be displayed on the terminal device 30. Note that the server 10 may only generate spatial data for the terminal device 30 to generate a virtual video. Here, the terminal device 30 is an xR device (for example, an AR device). The server 10 executes the first generation processing when the method of allocating the local space to the remote space is the movement rate method. The first generation processing is executed by the control unit 13 of the server 10. Hereinafter, the first generation processing will be described with reference to the flowchart of FIG. 13.

First, the generation unit 132 of server 10 adjusts scales of the local space and the remote space (step S201). For example, the generation unit 132 adjusts scales on the basis of a comparison result between the area size of the local space and the area size of the remote space. The generation unit 132 calculates a scale ratio of each of length, width, and height on the basis of the area size of the local space and the area size of the remote space, and enlarges or reduces the scale of the remote space or the local space on the basis of the calculated scale ratio. FIG. 14 is a view illustrating a result of scale adjustment in the movement rate method. The local coordinates are coordinates in the local space, and the remote coordinates are coordinates in the remote space. As a result of the scale adjustment, the server 10 can handle two spaces having different sizes at the same coordinates.

Subsequently, the generation unit 132 adjusts the movement rate (step S202). The generation unit 132 adjusts the movement rate on the basis of the scale ratio calculated in step S201. For example, the generation unit 132 sets the scale ratio calculated in step S201 as the movement ratio as it is.

Subsequently, the acquisition unit 131 of the server 10 acquires the position/posture information of the user from the terminal device 30. Then, the generation unit 132 of the server 10 generates a virtual video image to be displayed on the terminal device 30 on the basis of the scale ratio calculated in step S201 and the position/posture information of the user, the virtual video image in a case where it is assumed that the user is at a predetermined position (coordinates specified by the position/posture information) in the remote space. Then, the server 10 performs processing for AR superimposition rendering on the basis of the virtual video (step S203). The AR superimposition rendering may be performed by the terminal device 30.

Subsequently, the generation unit 132 starts tracking of movement (movement direction and movement amount) in the local space of the user wearing the terminal device 30 (step S204). The generation unit 132 executes tracking as needed on the basis of the position/posture information from the terminal device 30. Then, the generation unit 132 updates the field of view of the user (that is, the virtual video to be displayed on the terminal device 30) based on the tracking result (step S205). For example, the generation unit 132 calculates a virtual movement amount of the user in the remote space in a case where the user wearing the terminal device 30 moves in the local space. At this time, the generation unit 132 sets a value obtained by multiplying the movement amount of the user in the local space by the movement rate calculated in step S202 as the virtual movement amount of the user in the remote space. Then, the generation unit 132 updates the virtual video on the basis of the calculated virtual movement amount.

Next, the server 10 determines whether the end condition of the first generation processing is satisfied (step S206). For example, the server 10 determines whether a notification of connection termination has been received from the terminal device 30. If the end condition is not satisfied (step S206: No), the server 10 returns to step S205 and continues the processing of updating the field of view. In a case where the end condition is satisfied (step S206: Yes), the server 10 ends the first generation processing.

3-5. Second Generation Processing

Figure 15:
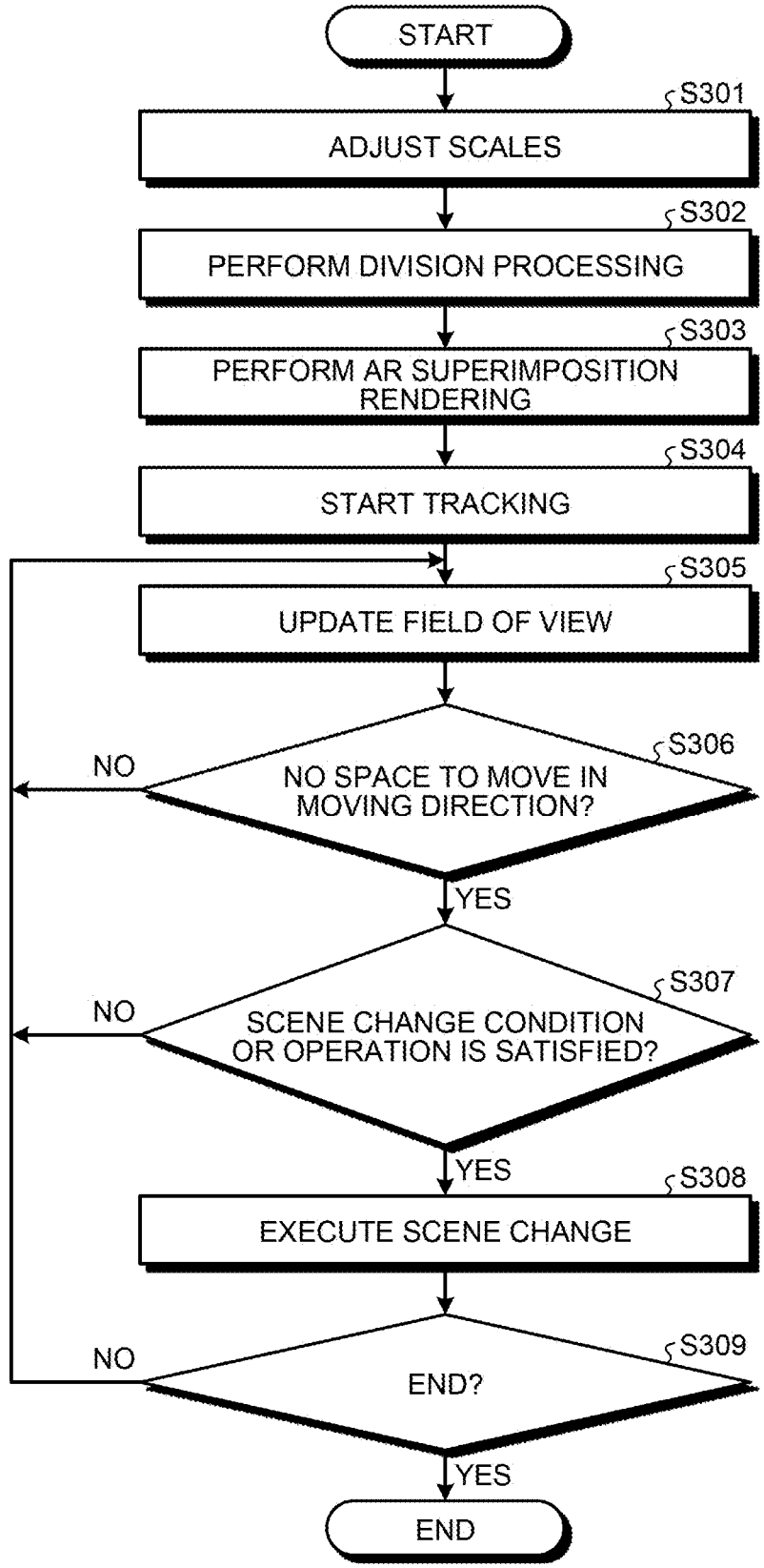
FIG. 15 is a flowchart for explaining a second generation processing.

Next, virtual video generation processing based on the division method (second generation processing) will be described. FIG. 15 is a flowchart for explaining the second generation processing. In the following description, it is assumed that the server 10 generates a virtual video to be displayed on the terminal device 30. Note that the server 10 may only generate spatial data for the terminal device 30 to generate a virtual video. Here, the terminal device 30 is an xR device (for example, an AR device). The server 10 executes the second generation processing when the method of allocating the local space to the remote space is the division method. The second generation processing is executed by the control unit 13 of the server 10. Hereinafter, the second generation processing will be described with reference to the flowchart of FIG. 15.

First, the generation unit 132 of server 10 adjusts scales of the local space and the remote space (step S301). In the case of the division method, the scale of the local space and the scale of the remote space may be the same. As a matter of course, even in the division method, the scale of the local space and the scale of the remote space may be different from each other as in the movement rate method.

Subsequently, the server 10 performs division processing (step S302). For example, the acquisition unit 131 of the server 10 acquires information on the area size of the local space and information on the area size of the remote space. Then, the generation unit 132 of the server 10 divides the remote space into a plurality of areas (hereinafter, referred to as a divided region) in accordance with the size of the local space. Note that, in the following description, a divided region allocated to the local space as an initial setting is referred to as an initial divided region.

Subsequently, the acquisition unit 131 of the server 10 acquires the position/posture information of the user from the terminal device 30. Then, the generation unit 132 of the server 10 generates a virtual video image to be displayed on the terminal device 30 on the basis of the position/posture information, the virtual video image in a case where it is assumed that the user is at a predetermined position (coordinates specified by the position/posture information) in the initial divided region. Then, the server 10 performs processing for AR superimposition rendering on the basis of the virtual video (step S303). The AR superimposition rendering may be performed by the terminal device 30.

Subsequently, the generation unit 132 starts tracking of movement (movement direction and movement amount) in the local space of the user wearing the terminal device 30 (step S304). The generation unit 132 executes tracking as needed on the basis of the position/posture information from the terminal device 30. Then, the generation unit 132 updates the field of view of the user (that is, the virtual video to be displayed on the terminal device 30) based on the tracking result (step S305). For example, the generation unit 132 calculates a virtual movement amount of the user in the divided region in a case where the user wearing the terminal device 30 moves in the local space. At this time, the generation unit 132 sets the movement amount of the user in the local space as the virtual movement amount of the user in the divided region as it is. Then, the generation unit 132 updates the virtual video on the basis of the calculated virtual movement amount.

Figure 16:
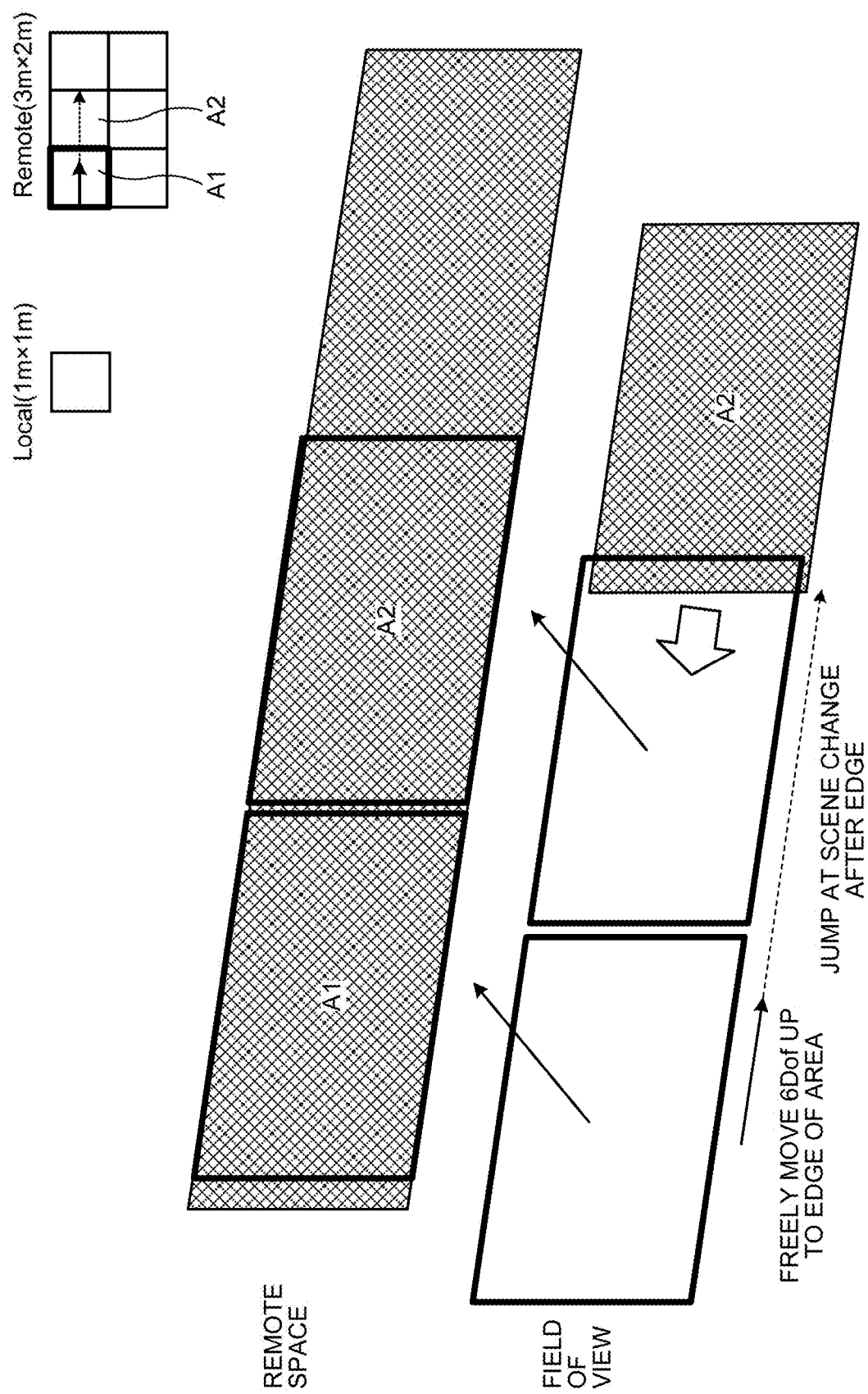
FIG. 16 is a diagram for explaining a scene change.

Note that it is possible to move the divided region by performing a predetermined operation by the user. In the following description, the movement of the divided region is referred to as a scene change. FIG. 16 is a diagram for explaining the scene change. In the example of FIG. 16, the local space is a space of height 1 m×width 1 m, and the remote space is a space of height 3 m×width 2 m. In the example of FIG. 16, the user is located in the divided region A1. The user can freely move 6 Dof up to the edge of the divided region A1. When the user arrives at the edge of the local space and performs a predetermined operation (for example, a gesture such as stepping or a button operation) on the spot, the server 10 performs a scene change. In the example of FIG. 16, the image of the divided region A2 slides in the user's field of view due to the scene change.

Based on the above, the description of the flowchart of FIG. 15 will be continued.

The generation unit 132 of the server 10 determines whether the user is located at the edge of the local space (whether there is no space to move in the moving direction) (step S306). When the user is not located at the edge of the divided region (step S306: No), the generation unit 132 returns the processing to step S305.

When the user is located at the edge of the divided region (step S306: Yes), the generation unit 132 determines whether a scene change condition is satisfied (alternatively, whether an operation for scene change has been performed) (step S307). For example, the generation unit 132 determines whether a predetermined operation has been performed by the user. When the scene change condition is not satisfied (step S307: No), the generation unit 132 returns the processing to step S305. When the scene change condition is satisfied (step S307: Yes), the generation unit 132 executes a scene change (step S308).

Figure 17:
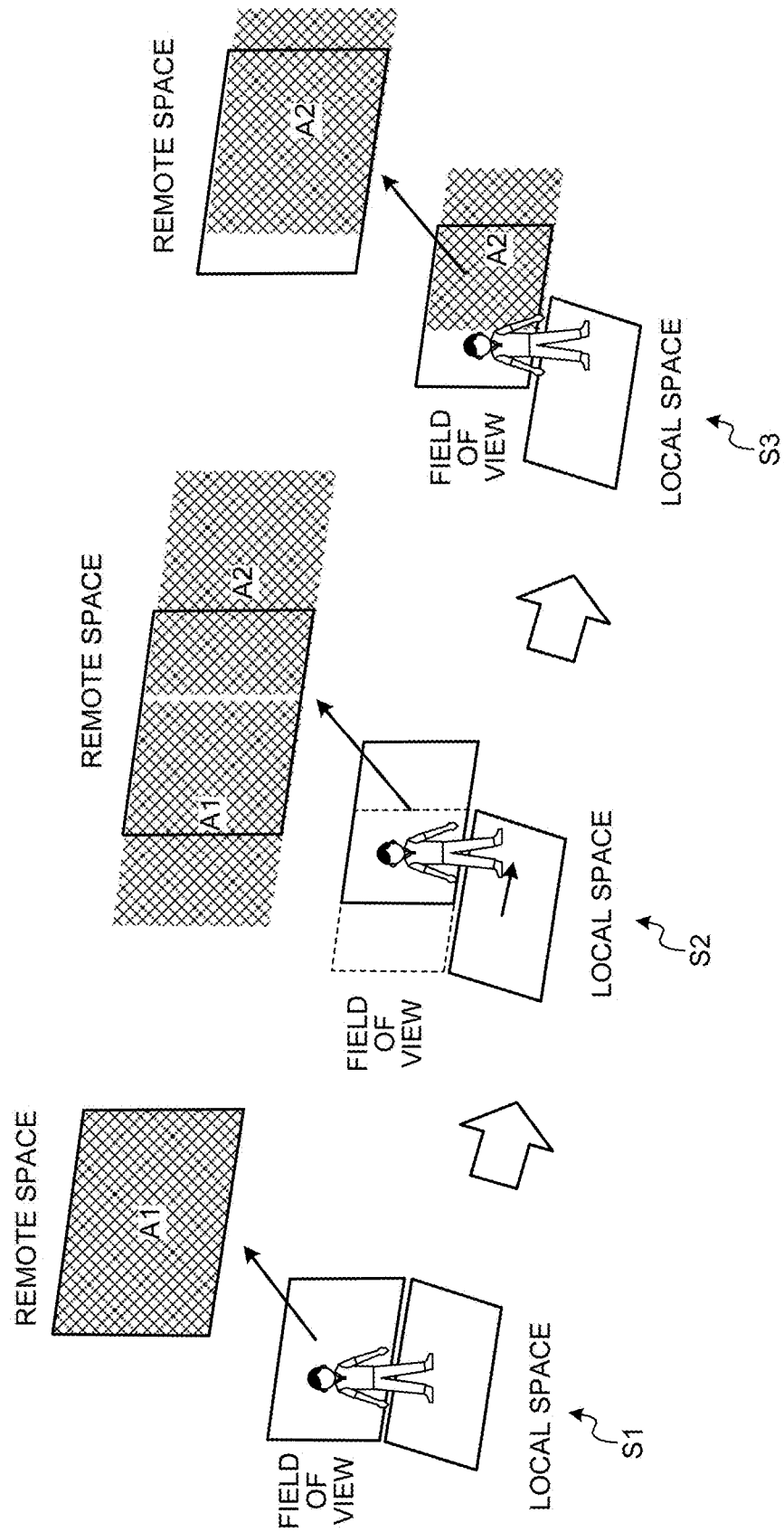
FIG. 17 is a diagram illustrating a scene change.

FIG. 17 is a diagram illustrating the scene change. In the example of a state S1 in FIG. 17, a local region is allocated to the divided region A1. When the user moves to the edge of the local region and performs a predetermined operation (state S2), the image of the adjacent divided region slides in the user's field of view (state S3). Here, the predetermined operation may be pressing of the scene change button, or may be continuing stepping at the edge of the local region.

Returning to FIG. 15, the server 10 determines whether the end condition of the second generation processing is satisfied (step S309). For example, the server 10 determines whether a notification of connection termination has been received from the terminal device 30. If the end condition is not satisfied (step S309: No), the server 10 returns to step S305. In a case where the end condition is satisfied (step S309: Yes), the server 10 ends the second generation processing.

3-6. Application Example

Figure 18:
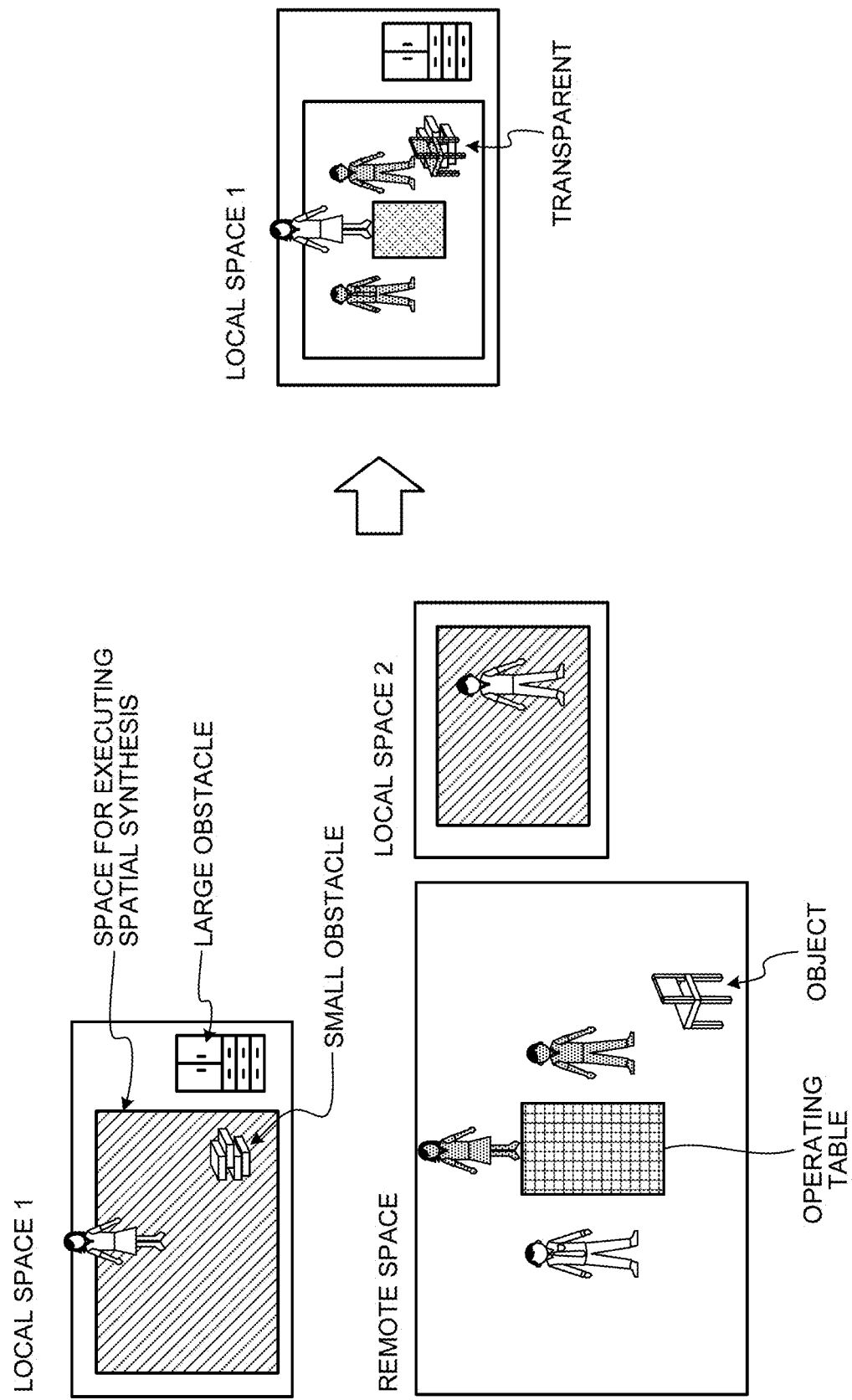
FIG. 18 is a diagram illustrating an application example of an information processing system.

FIG. 18 is a diagram illustrating an application example of the information processing system 1. The information processing system 1 illustrated in FIG. 18 is a system that enables a medical person to perform surgery from a remote place. In the example illustrated in FIG. 18, one person, an operating table, and an object (chair) are arranged in the remote space. Furthermore, in the example illustrated in FIG. 18, there are two local spaces, and one person is arranged in each local space. The spaces indicated by hatching are spaces in which the remote spaces are combined.

Attention is now focused on a local space 1. In the AR, overlapping of objects is avoided by occlusion processing, but avoiding overlapping at a plurality of points requires a common empty area, and there is a possibility that a use area becomes extremely small. Therefore, in the application example, a region with a large obstacle is avoided as a spatial synthesis space, but a region with a small obstacle is recognized as a spatial synthesis space (AR plane). Here, the spatial synthesis space is a target area of the local space information.

The right side of FIG. 18 illustrates a state of local space 1 seen from the user when a virtual video is displayed on the terminal device 30. The terminal device 30 is an xR device such as a VR device or an AR device. In the example of FIG. 18, an image of an object in the remote space overlaps an area with a small obstacle. In this case, the server 10 sets an image to be superimposed on the small obstacle (an image of a chair in the example of FIG. 18) as a transmissive state so that the user can see the small obstacle. Note that, in a case where the terminal device 30 is an AR device, the image of the chair and the small obstacle appear to overlap. In a case where the terminal device 30 is a VR device, the terminal device 30 performs transmission processing on the image of the chair to make the small obstacle visible to the user. This reduces the risk of the user colliding with the small obstacle.

4. Modification

The above-described embodiments are examples, and various modifications and applications are possible.

For example, in the above-described embodiment (the example of FIG. 14), the scales of the area size of the local space and the area size of the remote space are adjusted. In this case, the aspect ratio of the local space and the aspect ratio of the remote space may be different. In this case, as illustrated in FIG. 14, even if the user moves obliquely 45° in the local space, it does not indicate the user moves obliquely 45° in the remote space. Therefore, in a case where the local space is allocated to the remote space by the movement rate method, the server 10 may allocate the local space so as to maintain the aspect ratio. For example, the server 10 may set the space allocated to the remote space in the local space to a shape matching the shape of the remote space.

Figure 19:
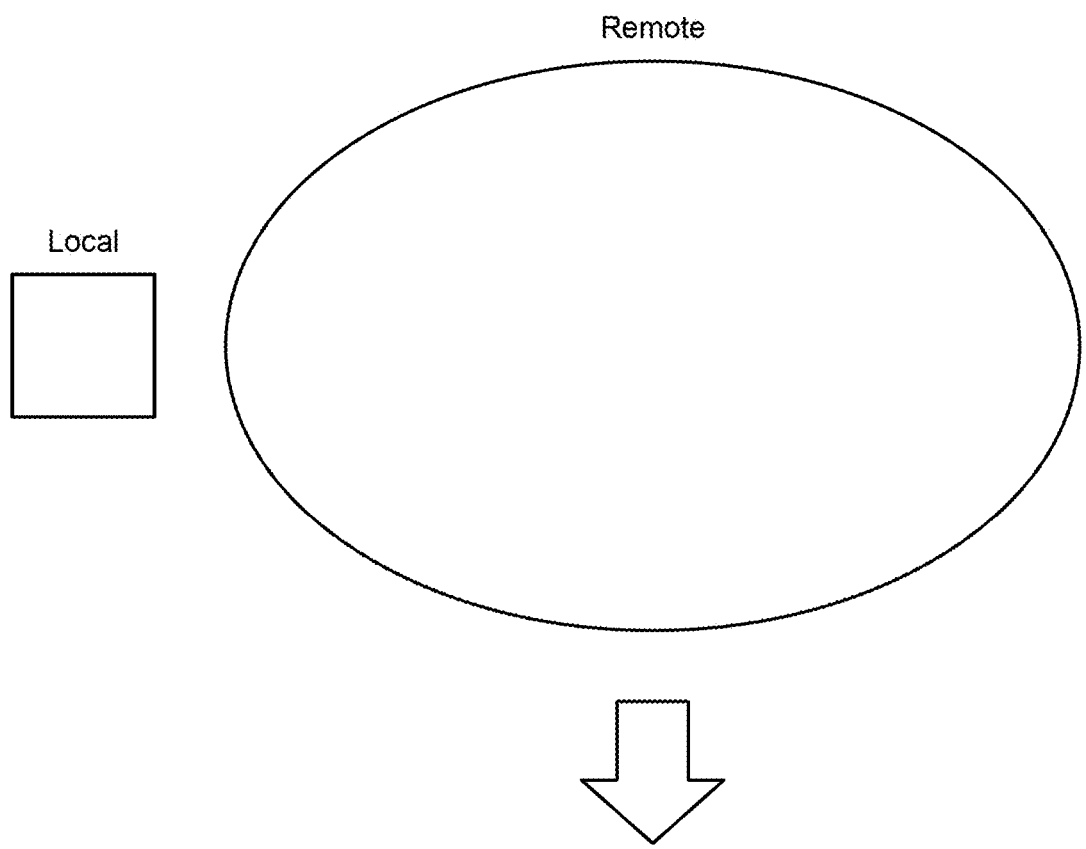
FIG. 19 is a diagram illustrating a processing example in a case where shapes of a remote space and a local space are greatly different.
Figure 20:
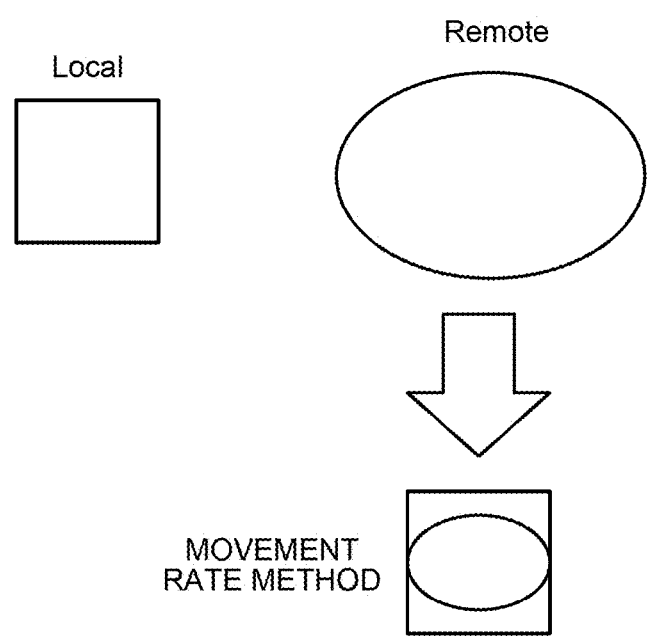
FIG. 20 is a diagram illustrating a processing example in a case where shapes of a remote space and a local space are greatly different.

Furthermore, in the above-described embodiment, the shapes of the remote space and the local space are not greatly different, but the shapes of the remote space and the local space may be greatly different. For example, there may be a case where one of the remote space and the local space is a rectangle extremely long in the longitudinal direction and the other is a square, or a case where one is a square or a rectangle and the other is a circle or an ellipse. FIGS. 19 and 20 are diagrams illustrating a processing example in a case where shapes of a remote space and a local space are greatly different. In the example of FIG. 19, the remote space and the local space are greatly different not only in shape but also in area size. In this case, the server 10 adopts the division method so as to include the entire region of the remote space. On the other hand, in the example of FIG. 20, the area sizes are close to each other. In this case, the server 10 adopts the movement rate method and adjusts the scale of the remote space or the local space so as to include the entire region of the remote space. At this time, the server 10 may be configured not to disturb the aspect ratio.

Furthermore, in the above-described embodiment, the remote space is a real space. However, the remote space may be a space (virtual space) on a completely cyberspace. In a case where the remote space is a virtual space, the remote space information is not necessarily information sensed by a device that senses the real world such as the imaging device 20. For example, the remote space information may be information of an artificial space designed by programming or the like, and stored in the server 10 or the like.

The control device that controls the server 10, the imaging device 20, or the terminal device 30 of the present embodiment may be realized by a dedicated computer system or may be realized by a general-purpose computer system.

For example, a communication program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control device. At this time, the control device may be an external device (for example, a personal computer) of the server 10, the imaging device 20, or the terminal device 30. Furthermore, the control device may be an internal device (for example, the control unit 13, the control unit 23, or the control unit 33) of the server 10, the imaging device 20, or the terminal device 30.

Further, the above-mentioned communication program may be stored in a disk device provided in a server device on a network such as the Internet in such a way to be downloaded to a computer. Further, the above-mentioned functions may be implemented by cooperation between an operating system (OS) and application software. In this case, other parts than OS may be stored in a medium for delivery, or other parts than OS may be stored in the server device and downloaded to a computer.

Among the processing described in the embodiments, all or a part of the processing, described as automatic processing, can be performed manually, or all or a part of the processing, described as manual processing, can be performed automatically by a known method. In addition, the processing procedures, specific names, and information including various data and parameters indicated in the document and the drawings can be arbitrarily changed unless otherwise specified. For example, various types of information illustrated in the drawings are not limited to the illustrated information.

Furthermore, the constituent elements of the individual devices illustrated in the drawings are functionally conceptual and are not necessarily configured physically as illustrated in the drawings. To be specific, the specific form of distribution and integration of the devices is not limited to the one illustrated in the drawings, and all or a part thereof can be configured by functionally or physically distributing and integrating in arbitrary units according to various loads, usage conditions, and the like.

Furthermore, the embodiments described above can be appropriately combined to the extent that the processing contents do not contradict each other. Furthermore, the order of each step illustrated in the flowcharts of the above-described embodiment can be changed as appropriate.

Furthermore, for example, the present embodiment can be implemented as any configuration constituting an apparatus or a system, for example, a processor as a system large scale integration (LSI) or the like, a module using a plurality of processors or the like, a unit using a plurality of modules or the like, a set further added other functions to a unit, or the like (that is, a configuration of a part of the device).

Note that, in the present embodiment, the system indicates a set of a plurality of components (devices, modules (parts), etc.), and it does not matter whether or not all the components are in the same housing. Therefore, a plurality of devices housed in separate housings and connected via a network and one device in which a plurality of modules is housed in one housing are both systems.

Furthermore, for example, the present embodiment can adopt a configuration of cloud computing in which one function is shared and processed by a plurality of devices in cooperation via a network.

5. Conclusion

As described above, the server 10 generates the spatial data for the terminal device 30 to generate the virtual video on the basis of the local space information, the local position information, and the remote space information. At this time, the server 10 calculates a virtual movement amount of the user in the remote space when the user moves in the local space, and generates information for updating the virtual video on the basis of the calculated virtual movement amount. Since the virtual video is updated on the basis of the virtual movement amount, the user can experience the sense of movement in the remote space without a feeling of strangeness. Furthermore, the server 10 changes the processing according to the sizes and shapes of the remote space and the local space, so that the user can experience movement in the remote space without any limitation and a feeling of strangeness.

Although the embodiments of the present disclosure have been described above, the technical scope of the present disclosure is not limited to the embodiments described above as it is, and various modifications can be made without departing from the gist of the present disclosure. In addition, constituent elements of different embodiments and modifications may be appropriately combined.

Furthermore, the effects of the embodiments described in the present specification are merely examples and are not limited, and other effects may be provided.

Note that the present technology can also have the following configurations.

(1)
An information processing apparatus comprising:
an acquisition unit configured to acquire local space information indicating space information of a local space where a terminal device is located, local position information indicating position information of the terminal device in the local space, and remote space information indicating space information of a remote space located in a place different from the local space; and
a generation unit configured to generate, on the basis of the local space information, the local position information, and the remote space information, information regarding a video to be displayed on the terminal device, the video being a virtual video in a case where the terminal device is at a position corresponding to the local position information in the remote space.

(2)
The information processing apparatus according to (1), wherein
the acquisition unit acquires posture information of the terminal device or a user of the terminal device, and
the generation unit generates information regarding the virtual video on the basis of the local space information, the local position information, the remote space information, and the posture information.

(3)
The information processing apparatus according to (1) or (2), wherein
the generation unit calculates a virtual movement amount of the terminal device in the remote space in a case where the terminal device moves in the local space, and generates information for updating the virtual video on the basis of the calculated virtual movement amount.

(4)
The information processing apparatus according to (3), wherein
the generation unit changes a method of calculating the virtual movement amount according to a method of allocating the local space to the remote space.

(5)
The information processing apparatus according to (4), wherein
the local space information includes information regarding an area size of the local space,
the remote space information includes information regarding an area size of the remote space, and
the generation unit changes a method of allocating the local space to the remote space on the basis of a comparison result between an area size of the local space and an area size of the remote space.

(6)
The information processing apparatus according to (5), wherein
in a case where a difference in size between the local space and the remote space is smaller than a predetermined threshold value, the generation unit allocates the local space to the remote space by a first method of enlarging or reducing a scale of the remote space or the local space, and calculates the virtual movement amount according to the magnitude of enlargement or reduction of the scale.

(7)
The information processing apparatus according to (6), wherein
the generation unit allocates the local space to the remote space so as to maintain an aspect ratio in a case where the local space is allocated to the remote space by the first method.

(8)
The information processing apparatus according to (5), wherein
in a case where a difference in size between the local space and the remote space is larger than a predetermined threshold value, the generation unit allocates the local space to the remote space by a second method of dividing one of the remote space and the local space according to the other space, and calculates a movement amount of the terminal device in the local space as the virtual movement amount as it is.

(9)
The information processing apparatus according to any one of (1) to (8), wherein
the information regarding the virtual video is spatial data of the remote space for the terminal device to generate the virtual video.

(10)
The information processing apparatus according to (9), comprising
a communication unit configured to receive the local position information from the terminal device and transmit the spatial data to the terminal device,
wherein the communication unit transmits or receives at least the local position information and the spatial data by using different network slices.

(11)
The information processing apparatus according to (9) or (10), wherein
the terminal device is an xR device, and
the generation unit generates the spatial data for the xR device to display the virtual video.

(12)
The information processing apparatus according to (11), wherein
the terminal device is an AR device, and
the generation unit generates the spatial data for the AR device to superimpose and display the virtual video on a real space.

(13)
The information processing apparatus according to (12), wherein
in a case where there is an object in the local space, the generation unit generates the spatial data such that a video superimposed on the object is in a transmissive state.

(14)
An information processing program
causing a computer to function as:
an acquisition unit configured to acquire local space information indicating space information of a local space where a terminal device is located, local position information indicating position information of the terminal device in the local space, and remote space information indicating space information of a remote space located in a place different from the local space; and
a generation unit configured to generate, on the basis of the local space information, the local position information, and the remote space information, information regarding a video to be displayed on the terminal device, the video being a virtual video in a case where the terminal device is at a position corresponding to the local position information in the remote space.

(15)
An information processing system comprising
an information processing apparatus and one or a plurality of terminal devices located in a local space,
the terminal device including:
a communication unit configured to transmit local space information indicating space information of the local space, and local position information indicating position information of the terminal device in the local space, to the information processing apparatus, and
the information processing device including:
an acquisition unit configured to acquire the local space information, the local position information, and remote space information indicating space information of a remote space located in a place different from the local space; and
a generation unit configured to generate, on the basis of the local space information, the local position information, and the remote space information, information regarding a video to be displayed on the terminal device, the video being a virtual video in a case where the terminal device is at a position corresponding to the local position information in the remote space.

(16)
An information processing method, comprising:
acquiring local space information indicating space information of a local space where a terminal device is located, local position information indicating position information of the terminal device in the local space, and remote space information indicating space information of a remote space located in a place different from the local space; and
generating, on the basis of the local space information, the local position information, and the remote space information, information regarding a video to be displayed on the terminal device, the video being a virtual video in a case where the terminal device is at a position corresponding to the local position information in the remote space.

REFERENCE SIGNS LIST

1 INFORMATION PROCESSING SYSTEM
10 SERVER
20 IMAGING DEVICE
30 TERMINAL DEVICE
11, 21, 31 COMMUNICATION UNIT
12, 22, 32 STORAGE UNIT
13, 23, 33 CONTROL UNIT
24, 36 SENSOR UNIT
25, 37 IMAGING UNIT
34 INPUT UNIT
35 OUTPUT UNIT
131 ACQUISITION UNIT
132 GENERATION UNIT

The invention claimed is:
1. An information processing apparatus, comprising:
processing circuitry configured to
acquire local space information indicating space information of a local space where a terminal device is located, local position information indicating position information of the terminal device in the local space, and remote space information indicating space information of a remote space located in a place different from the local space,
calculate a virtual movement amount of the terminal device in the remote space in a case where the terminal device moves in the local space,
generate, on the basis of the local space information, the local position information, and the remote space information, information regarding a video to be displayed on the terminal device, the video being a virtual video in a case where the terminal device is at a position corresponding to the local position information in the remote space,
in a case where a difference in size between the local space and the remote space is smaller than a predetermined threshold value, allocate the local space to the remote space by a first method of enlarging or reducing a scale of the remote space or the local space, and calculate the virtual movement amount according to a magnitude of enlargement or reduction of the scale of the remote space or the local space,
allocate the local space to the remote space so as to maintain an aspect ratio in a case where the local space is allocated to the remote space by the first method, and
in a case where a difference in size between the local space and the remote space is larger than a predetermined threshold value, allocate the local space to the remote space by a second method of dividing the remote space according the local space or dividing the local according to the remote space, and set a movement amount of the terminal device in the local space equal to the virtual movement amount.

2. The information processing apparatus according to claim 1, wherein the processing circuitry is further configured to
acquire posture information of the terminal device or a user of the terminal device, and
generate information regarding the virtual video on the basis of the local space information, the local position information, the remote space information, and the posture information.

3. The information processing apparatus according to claim 1,
wherein the processing circuitry is further configured to generate information for updating the virtual video on the basis of the calculated virtual movement amount.

4. The information processing apparatus according to claim 1, wherein
the local space information includes information regarding an area size of the local space, and
the remote space information includes information regarding an area size of the remote space.

5. The information processing apparatus according to claim 1, wherein
the information regarding the virtual video is spatial data of the remote space for the terminal device to generate the virtual video.

6. The information processing apparatus according to claim 5, wherein the processing circuitry is further configured to
receive the local position information from the terminal device and transmit the spatial data to the terminal device, and
transmit or receive at least the local position information and the spatial data by using different network slices.

7. The information processing apparatus according to claim 5, wherein
the terminal device is an extended reality (xR) device, and
the generation unit generates the spatial data for the xR device to display the virtual video.

8. The information processing apparatus according to claim 7, wherein
the terminal device is an augmented reality (AR) device, and
wherein the processing circuitry is further configured to generate the spatial data for the AR device to superimpose and display the virtual video on a real space.

9. The information processing apparatus according to claim 8, wherein the processing circuitry is further configured to
in a case where there is an object in the local space, generate spatial data such that a video superimposed on the object is in a transmissive state.

10. A non-transitory computer-readable storage medium storing computer-readable instructions thereon which, when executed by a computer, cause the computer to perform a method, the method comprising
acquiring local space information indicating space information of a local space where a terminal device is located, local position information indicating position information of the terminal device in the local space, and remote space information indicating space information of a remote space located in a place different from the local space;
calculating a virtual movement amount of the terminal device in the remote space in a case where the terminal device moves in the local space,
generating, on the basis of the local space information, the local position information, and the remote space information, information regarding a video to be displayed on the terminal device, the video being a virtual video in a case where the terminal device is at a position corresponding to the local position information in the remote space;
in a case where a difference in size between the local space and the remote space is smaller than a predetermined threshold value, allocating the local space to the remote space by a first method of enlarging or reducing a scale of the remote space or the local space, and calculating the virtual movement amount according to a magnitude of enlargement or reduction of the scale of the remote space or the local space;
allocating the local space to the remote space so as to maintain an aspect ratio in a case where the local space is allocated to the remote space by the first method;
in a case where a difference in size between the local space and the remote space is larger than a predetermined threshold value, allocating the local space to the remote space by a second method of dividing the remote space according the local space or dividing the local according to the remote space, and setting a movement amount of the terminal device in the local space equal to the virtual movement amount.

11. An information processing system, comprising:
an information processing apparatus and one or a plurality of terminal devices located in a local space,
the terminal device including first processing circuitry configured to:
transmit local space information indicating space information of the local space, and local position information indicating position information of the terminal device in the local space, to the information processing apparatus; and
the information processing device including second processing circuitry configured to:
acquire the local space information, the local position information, and remote space information indicating space information of a remote space located in a place different from the local space,
calculate a virtual movement amount of the terminal device in the remote space in a case where the terminal device moves in the local space,
generate, on the basis of the local space information, the local position information, and the remote space information, information regarding a video to be displayed on the terminal device, the video being a virtual video in a case where the terminal device is at a position corresponding to the local position information in the remote space,
in a case where a difference in size between the local space and the remote space is smaller than a predetermined threshold value, allocate the local space to the remote space by a first method of enlarging or reducing a scale of the remote space or the local space, and calculate the virtual movement amount according to a magnitude of enlargement or reduction of the scale of the remote space or the local space,
allocate the local space to the remote space so as to maintain an aspect ratio in a case where the local space is allocated to the remote space by the first method, and
in a case where a difference in size between the local space and the remote space is larger than a predetermined threshold value, allocate the local space to the remote space by a second method of dividing the remote space according the local space or dividing the local according to the remote space, and set a movement amount of the terminal device in the local space equal to the virtual movement amount.

* * * * *